US008649350B2

United States Patent
Yang et al.

(10) Patent No.: US 8,649,350 B2
(45) Date of Patent: Feb. 11, 2014

(54) METHOD AND SYSTEM FOR TRANSMITTING UPLINK CONTROL SIGNALING ON PHYSICAL UPLINK SHARED CHANNEL

(75) Inventors: Weiwei Yang, Shenzhen (CN); Bo Dai, Shenzhen (CN); Dezhong Mi, Shenzhen (CN); Shuqiang Xia, Shenzhen (CN); Chunli Liang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/636,769

(22) PCT Filed: Sep. 21, 2010

(86) PCT No.: PCT/CN2010/077211
§ 371 (c)(1),
(2), (4) Date: Sep. 24, 2012

(87) PCT Pub. No.: WO2011/124058
PCT Pub. Date: Oct. 13, 2011

(65) Prior Publication Data
US 2013/0022009 A1    Jan. 24, 2013

(30) Foreign Application Priority Data
Apr. 7, 2010  (CN) .......................... 2010 1 0143064

(51) Int. Cl.
*H04W 4/00* (2009.01)
*H04B 7/212* (2006.01)
*H04B 7/00* (2006.01)
*H04B 15/00* (2006.01)

(52) U.S. Cl.
USPC ........... 370/329; 370/324; 370/341; 455/511; 455/515

(58) Field of Classification Search
None
See application file for complete search history.

(56) References Cited

U.S. PATENT DOCUMENTS

| | | | | |
|---|---|---|---|---|
| 2010/0040001 A1* | 2/2010 | Montojo et al. | ............... | 370/329 |
| 2010/0195624 A1* | 8/2010 | Zhang et al. | ................... | 370/335 |

FOREIGN PATENT DOCUMENTS

| | | |
|---|---|---|
| CN | 1508993 A | 6/2004 |
| CN | 101807974 A | 8/2010 |
| WO | 2006021828 A1 | 3/2006 |

OTHER PUBLICATIONS

International Search Report for PCT/CN2010/077211 dated Jan. 4, 2011.

*Primary Examiner* — Ayaz Sheikh
*Assistant Examiner* — Sori Aga
(74) *Attorney, Agent, or Firm* — Ling Wu; Stephen Yang; Ling and Yang Intellectual Property

(57) ABSTRACT

A method for transmitting an uplink control signaling on a physical uplink shared channel is provided in the present invention, and the method includes: respectively encoding the uplink control signaling and data information corresponding to a transmission block needed to be transmitted, and truncating the corresponding encoded information according to a target length; and when one transmission block corresponds to a plurality of layers, interleaving the information on various layers to be transmitted on the transmission block, and transmitting the interleaved information on a layer corresponding to the Physical Uplink Shared Channel (PUSCH); wherein the information on various layers includes uplink control signaling information, or the information on various layers includes the data information and the uplink control signaling information. The invention also provides a system for transmitting an uplink control signaling on a physical uplink shared channel, and the system includes a encoding module, an interleaving module and a transmitting module.

15 Claims, 10 Drawing Sheets

METHOD AND SYSTEM FOR TRANSMITTING UPLINK CONTROL SIGNALING ON PHYSICAL UPLINK SHARED CHANNEL

TECHNICAL FIELD

The present invention relates to the field of digital communications, and in particular, to a system and method for transmitting uplink control signaling on a physical uplink shared channel.

BACKGROUND OF THE RELATED ART

In the Long Term Evolution (LTE) system, the control signaling needed to be transmitted on the uplink has an Acknowledgement/Negative Acknowledgement (ACK/NACK), and three forms of Channel State Information (CSI) reflecting a downlink physical channel state, i.e., a Channels Quality Indication (CQI), a Pre-encoding Matrix Indicator (PMI) and a Rank Indicator (RI).

In the LTE system, an ACK/NACK response message is transmitted in a format of 1/1a/1b on the Physical Uplink Control Channel (PUCCH) (PUCCH format1/1a/1/b), and if the User Equipment (UE) needs to transmit the uplink data, the ACK/NACK response message is transmitted on a Physical Uplink Shared Channel (PUSCH), and the feedback of the CQI/PMI and RI can be a periodic feedback, or can also be a non-periodic feedback, and the specific feedback is shown in table 1:

TABLE 1

Uplink physical channel corresponding to periodic feedback and non-periodic feedback

| Scheduling mode | Periodic CQI report channel | Non-periodic CQI report channel |
|---|---|---|
| Frequency non-selective | PUCCH | |
| Frequency selective | PUCCH | PUSCH |

Wherein, for the CQI/PMI and RI which are periodically fed back, if the UE needs not to transmit the uplink data, the CQI/PMI and RI which are periodically fed back are transmitted in a format of 2/2a/2b on the PUCCH (PUCCH format2/2a/2b); and if the UE needs to transmit the uplink data, the CQI/PMI and RI are transmitted on the PUSCH; and for the CQI/PMI and RI which are non-periodically fed back, the CQI/PMI and RI are only transmitted on the PUSCH.

FIG. 1 illustrates a diagram of transmitting uplink control signaling on a PUSCH in a LTE system, uplink data and uplink control information being carried on the PUSCH, wherein, the uplink control information comprises a CQI, a PMI, a RI and an ACK/NACK.

FIG. 2 illustrates a transmission mode of the PUSCH in a LTE system, and it can be seen from the figure that the PUSCH is transmitted in a form of a single antenna, and therefore, the PUSCH only corresponds to one transmission block, and the transmission block forms one codeword stream after being performed with channel encoding, that is, in the LTE system, the PUSCH has only one codeword stream.

In the LTE system, the eNB transmits a modulation encoding index $I_{MCS}$ to the UE through a PDCCH, and related information such as the modulation encoding index $I_{MCS}$ and the modulation of the PUSCH, a transmission block size and a redundancy version etc. and relation therebetween are defined, as shown in table 4; and in the LTE system, it is also defined that a code rate is obtained according to a relation between a transmission block size index and the transmission block size, and according to the transmission block size and a resource block size.

TABLE 4

Modulation of the PUSCH, transmission block size and redundancy version

| Modulation encoding index $I_{MCS}$ | Modulation order $Q_m'$ | Transmission block size index $I_{TBS}$ | Redundancy version rvidx |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

A Long Term Evolution Advanced (LTE-A) system as an evolution standard of the LTE supports a larger transmission rate for the uplink, and therefore, the transmission of the PUSCH supports a form of spatial division multiplexing. For the PUSCH which is transmitted in the form of spatial division multiplexing, related technologies present that a mapping relation from a codeword stream to a layer is the same as the mapping from the codeword stream to the layer during downlink transmission in the LTE system, and a specific mapping process is shown in table 5:

TABLE 5

Mapping table from the codeword to the layer when the PUSCH uses spatial division multiplexing in the LTE-A system

| Layer number | Codeword number | Mapping from the codeword to the layer $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$<br>$x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$<br>$x^{(1)}(i) = d^{(0)}(2i+1)$ | $M_{symb}^{layer} = M_{symb}^{(0)}/2$ |
| 3 | 2 | $x^{(0)}(i) = d^{(0)}(i)$<br>$x^{(1)}(i) = d^{(1)}(2i)$<br>$x^{(2)}(i) = d^{(1)}(2i+1)$ | $M_{symb}^{layer} = M_{symb}^{(0)} = M_{symb}^{(1)}/2$ |

TABLE 5-continued

Mapping table from the codeword to the layer when the
PUSCH uses spatial division multiplexing in the LTE-A system

| Layer number | Codeword number | Mapping from the codeword to the layer $i = 0, 1, \ldots, M_{symb}^{layer} - 1$ | |
|---|---|---|---|
| 4 | 2 | $x^{(0)}(i) = d^{(0)}(2i)$ $x^{(1)}(i) = d^{(0)}(2i + 1)$ $x^{(2)}(i) = d^{(1)}(2i)$ $x^{(3)}(i) = d^{(1)}(2i + 1)$ | $M_{symb}^{layer} = M_{symb}^{(0)}/2 =$ $M_{symb}^{(1)}/2$ | wherein, $M_{symb}^{layer}$ represents an amount of data transmitted on each layer, $M_{symb}^{(0)}$ and $M_{symb}^{(1)}$ represent symbol numbers on various codeword streams respectively, $d^{(0)}(i)$ and $d^{(1)}(i)$ represent data on various codeword streams respectively, and $x^{(0)}(i) \ldots x^{(3)}(i)$ represent data transmitted on various layers respectively.

In the LTE-A system, the transmission of the PUSCH supports the condition of spatial division multiplexing; however, in the existing technologies, a scheme of transmitting the uplink control signaling on the PUSCH when the PUSCH uses the spatial division multiplexing is not presented.

SUMMARY OF THE INVENTION

In order to solve the above technical problems, the present invention provides a system and method for transmitting uplink control signaling on a physical uplink shared channel, which can solve the problem of not being able to transmit uplink control signaling on the PUSCH while the PUSCH uses spatial divisional multiplexing in the LTE-A system in the prior art.

The present invention provides a method for transmitting uplink control signaling on a physical uplink shared channel, comprising:

respectively encoding the uplink control signaling needed to be transmitted and data information corresponding to a transmission block and truncating the corresponding encoded information according to a target length; and when one transmission block corresponds to a plurality of layers, interleaving information on various layers to be transmitted on the transmission block, and transmitting the interleaved information on a layer corresponding to the Physical Uplink Shared Channel (PUSCH);

wherein the information on the various layers includes uplink control signaling information, or the information on the various layers includes the data information and the uplink control signaling information.

The method further comprises:
selecting a target transmission block transmitting the uplink control signaling.

The uplink control signaling needed to be transmitted comprises any one or more of the following information: an Acknowledgement or Negative Acknowledgement response message, as well as rank indication information and channel state information;

after the step of truncating the corresponding encoded information according to a target length, the method further comprises:

generating an Acknowledgement or Negative Acknowledgement response message logic unit, a rank indication information logic unit and a channel state information logic unit in a form of modulation symbols from the encoded uplink control signaling and the data information corresponding to the target transmission block; and performing the following operations before the interleaving:

if there is data transmission on the target transmission block, multiplexing the data information logic unit corresponding to the target transmission block and the channel state information logic unit, to obtain a new data information logic unit; and if there is no data transmission on the target transmission block, mapping the channel state information logic unit, to obtain a new data information logic unit.

The step of interleaving the information on the various layers to be transmitted on the transmission block comprises:
performing channel interleaving on the Acknowledgement or Negative Acknowledgement response message logic unit, the rank indication information logic unit and the new data information logic unit which are on the transmission block, to obtain a control and/or data information bit sequence.

The step of multiplexing the data information logic unit corresponding to the target transmission block and the channel state information logic unit comprises:

first placing the channel state logic unit on the new data information logic unit, and then placing the data information logic unit corresponding to the target transmission block on the new data information logic unit, wherein, a length of the obtained new data information logic unit is a sum of lengths of the channel state information logic unit and the data information logic unit; and in the step of mapping the channel state information logic unit to obtain a new data information logic unit, the new data information logic unit is a channel state information logic unit.

The method further comprises:
when the target transmission block is transmitted on the PUSCH and a number of corresponding transmission layers is 1, performing channel interleaving on the Acknowledgement or Negative Acknowledgement response message logic unit, the rank indication information logic unit and the new data information logic unit, to obtain an interleaved control and/or data information bit sequence;

generating one virtual matrix according to a total number of the rank indication information logic unit and the new data information logic unit; and when writing data into the virtual matrix, first writing elements in the rank indication information logic unit into preset locations of the virtual matrix in a descending order of row numbers progressively from a last row of the virtual matrix row by row, and then writing elements in the new data information logic unit into the virtual matrix in an ascending order of row numbers progressively from a first row of the virtual matrix row by row, wherein, locations where the rank indication information logic units have been written are skipped; and finally, writing the elements in the Acknowledgement or Negative Acknowledgement response message logic unit into preset locations of the virtual matrix in turn in a descending order of row numbers progressively from the last row of the virtual matrix row by row; and when reading out data in the virtual matrix, reading out the elements in the virtual matrix progressively from the first column of the matrix column by column, wherein, for each column, the elements are read out in an ascending order of row numbers in turn progressively, and for each element, it is read out by means of a bit sequence, to finally obtain a control and/or data information bit sequence.

The step of performing channel interleaving on the Acknowledgement or Negative Acknowledgement response message logic unit, the rank indication information logic unit and the new data information logic unit, to obtain a control and/or data information bit sequence comprises:

when the target transmission block is transmitted on the PUSCH and a number of corresponding transmission layers is 2, generating an Acknowledgement or Negative Acknowledgement response message logical block unit, a rank indication information logic block unit and a new data information logic block unit according to the Acknowledgement or Negative Acknowledgement response message logic unit, the rank indication information logic unit and the new data information logic block unit;

then generating one virtual matrix according to a total number of the rank indication information logic block unit and the new data information logic block unit; and when writing data into the virtual matrix, first writing elements in the rank indication information logic block unit into preset locations of the virtual matrix in a descending order of row numbers progressively from a last row of the virtual matrix row by row, and then writing elements in the new data information logic block unit into the virtual matrix in an ascending order of row numbers progressively from a first row of the virtual matrix row by row, wherein, locations where the rank indication information logic block units have been written are skipped; and finally, writing elements in the Acknowledgement or Negative Acknowledgement response message logic block unit into preset locations of the virtual matrix in a descending order of row numbers progressively from the last row of the virtual matrix row by row; and when reading out data in the virtual matrix, reading out the elements in the virtual matrix from a first column of the matrix column by column, wherein, for each column, the elements are read out in an ascending order of row numbers in turn progressively, and for each element, it is read out in by means of a bit sequence, to finally obtain a control and/or data information bit sequence.

The step of performing channel interleaving on the Acknowledgement or Negative Acknowledgement response message logic unit, the rank indication information logic unit and the new data information logic unit, to obtain a control and/or data information bit sequence comprises:

when the target transmission block is transmitted on the PUSCH and a number of corresponding transmission layers is 2, generating two virtual matrixes according to a total number of the rank indication information logic unit and the new data information logic unit, which are a first virtual matrix and a second virtual matrix respectively; and when writing data into the first virtual matrix, first writing first location elements in the rank indication information logic unit into preset locations of the first virtual matrix in a descending order of row numbers progressively from a last row of the first virtual matrix row by row, and then writing first location elements in the new data information logic unit into the first virtual matrix in an ascending order of row numbers progressively from a first row of the first virtual matrix row by row, wherein, when writing data, locations where the rank indication information logic units have been written are skipped; and finally, writing first location elements in the Acknowledgement or Negative Acknowledgement response message logic unit preset locations of the first virtual matrix in a descending order of row numbers progressively from the last row of the first virtual matrix row by row;

when writing data into the second virtual matrix, first writing second location elements in the rank indication information logic unit into preset locations of the second virtual matrix in a descending order of row numbers progressively from a last row of the second virtual matrix row by row, and then writing second location elements in the new data information logic unit into the second virtual matrix in an ascending order of row numbers progressively from a first row of the second virtual matrix row by row, wherein, when writing data, locations where the rank indication information logic units have been written are skipped; and finally, writing second location elements in the Acknowledgement or Negative Acknowledgement response message logic unit into preset locations of the second virtual matrix in a descending order of row numbers progressively from the last row of the second virtual matrix row by row; and when reading out data in the virtual matrix, for each virtual matrix, reading out the elements in the matrix from a first column of the virtual matrix column by column, wherein, for each column, is the elements are read out in an ascending order of row numbers in turn progressively, in the read out elements, the elements read out from the first virtual matrix constitute first location elements in the control information and/or data information logic unit, and the elements read out from the second virtual matrix constitute second location elements in the control information and/or data information logic unit, and for each element, it is read out by means of a bit sequence, to finally obtain a control and/or data information bit sequence.

The step of performing channel interleaving on the Acknowledgement or Negative Acknowledgement response message logic unit, the rank indication information logic unit and the new data information logic unit, to obtain a control and/or data information bit sequence comprises:

when the target transmission block is transmitted on the PUSCH and a number of corresponding transmission layers is 2, generating one virtual matrix according to a total number of the rank indication information logic unit and the new data information logic unit; and when writing data into the virtual matrix, writing first location elements in the various logic units into the virtual matrix according to the following mode: first writing the first location elements in the rank indication information logic unit into preset locations of the virtual matrix every one row from a last but one row of the virtual matrix, and then writing first location elements in the new data information logic unit into the virtual matrix every one row from a first row of the virtual matrix, wherein, when writing data, locations where the rank indication information logic units have been written are skipped; and finally, writing the first location elements in the Acknowledgement or Negative Acknowledgement response message logic unit into preset locations of the virtual matrix every one row from a last but one row of the virtual matrix;

when writing data into the virtual matrix, writing second location elements in the various logic units into the virtual matrix according to the following mode: first writing the second location elements in the rank indication information logic unit into preset locations of the virtual matrix every one row from a last row of the virtual matrix, and then writing the second location elements in the new data information logic unit into the virtual matrix every one row from a second row of the virtual matrix, wherein, when writing data, locations where the rank indication information logic units have been written are skipped; and finally, writing the second location elements in the Acknowledgement or Negative Acknowledgement response message logic unit into preset locations of the virtual matrix every one row from the last row of the virtual matrix; and when reading out data in the virtual matrix, reading out the elements in the virtual matrix from a first column of the matrix column by column, wherein, for each column, the elements are read out in an ascending order of row numbers in turn progressively, and for each element, it is read out by means of a bit sequence, to finally obtain a control and/or data information bit sequence.

A number of the elements of the new data information logic unit is set as $H'_1$, a number of the elements of the rank indication information logic unit is set as $Q'_{RI}$, a product of a row number and a column number of the generated virtual matrix is $(H'_1+Q'_{RI})$;

when the sub-frame uses a normal cyclic prefix structure, the column number of the virtual matrix is 12; when the sub-frame uses an extended cyclic prefix structure, the column number of the virtual matrix is 10; and if there is a Sounding Reference Signal (SRS) needed to be transmitted, when the sub-frame uses the normal cyclic prefix structure, the column number of the virtual matrix is 11; and when the sub-frame uses the extended cyclic prefix structure, the column number of the virtual matrix is 9.

The step of generating an Acknowledgement or Negative Acknowledgement response message logic block unit, a rank indication information logic block unit and a new data information logic block unit comprises:

first location elements in the Acknowledgement or Negative Acknowledgement response message logic unit constituting a first Acknowledge/Negative Acknowledgement response message logic sub-unit, second location elements in the Acknowledgement or Negative Acknowledgement response message logic unit constituting a second Acknowledge/Negative Acknowledgement response message logic sub-unit, similarly, first location elements in the rank indication information logic unit constituting a first rank indication information logic sub-unit, second location elements in the rank indication information logic unit constituting a second rank indication information logic sub-unit, and first location elements in the new data information logic unit constituting a first new data information logic sub-unit, second location elements in the new data information logic unit constituting a second new data information logic sub-unit, and the various logic sub-units constituting the various logic block units; and setting the first logic sub-unit as $[q_{10}, q_{11}, q_{12}, \ldots, q_{1m}]$ and the second logic sub-unit as $[q_{20}, q_{21}, q_{22}, \ldots, q_{2m}]$, the generated logic block unit being $[q_0, q_1, q_2, \ldots, q_m]$, wherein, $q_i$ is a matrix comprised of $q_{1i}$ and $q_{2i}$.

A number of the elements of the rank indication information logic block unit is set as $M_{RI}$, a number of the elements of the new data information logic block unit is set as M, a product of a row number and a column number of the generated virtual matrix is $(M+M_{RI})$;

when the sub-frame uses a normal cyclic prefix structure, the column number of the virtual matrix is 12; when the sub-frame uses an extended cyclic prefix structure, the column number of the virtual matrix is 10; and if there is a Sounding Reference Signal (SRS) needed to be transmitted, when the sub-frame uses the normal cyclic prefix structure, the column number of the virtual matrix is 11; and when the sub-frame uses the extended cyclic prefix structure, the column number of the virtual matrix is 9.

A number of the elements of the new data information logic unit is set as $H'_1$, a number of the elements of the rank indication information logic unit is set as $Q'_{RI}$, a product of a row number and a column number of each generated virtual matrix is $(H'_1+Q'_{RI})/2$; when the sub-frame uses a normal cyclic prefix structure, the column number of each virtual matrix is 12; when the sub-frame uses an extended cyclic prefix structure, the column number of each virtual matrix is 10; and if there is a SRS needed to be transmitted, when the sub-frame uses the normal cyclic prefix structure, the column number of each virtual matrix is 11; and when the sub-frame uses the extended cyclic prefix structure, the column number of each virtual matrix is 9.

The first location elements refer to a first half of the elements in the logic unit, and the second location elements refer to a second half of the elements in the logic unit; or the first location elements refer to a second half of the elements in the logic unit, and the second location elements refer to a first half of the elements in the logic unit; or when element numbers in the logic unit are started from 0, the first location elements refer to even elements in the logic unit, and the second location elements refer to odd elements in the logic unit; or when the element numbers in the logic unit are started from 1, the first location elements refer to odd elements in the logic unit, and the second location elements refer to even elements in the logic unit.

If two transmission blocks are configured and there are corresponding data information on both transmission blocks, a mode of selecting the target transmission block is any one of the following modes:

fixing the target transmission block to a first transmission block or a second transmission block;

selecting the target transmission block according to a signaling indication;

selecting a transmission block with a larger modulation encoding index as the target transmission block; and selecting a transmission block with a larger transmission block size and a larger ratio of the resources which are occupied by the transmission block as the target transmission block;

if two transmission blocks are configured and there is corresponding data information on only one transmission block, the target transmission block is a transmission block with no corresponding data information; and if one transmission block is configured, the target transmission block is the transmission block.

The present invention further provides a system for transmitting uplink control signaling on a physical uplink shared channel comprising an encoding module, an interleaving module and a transmitting module, wherein, the encoding module is configured to encode the uplink control signaling needed to be transmitted and data information corresponding to a transmission block and truncate the corresponding encoded information; and the interleaving module is configured to when one transmission block corresponds to a plurality of layers, interleave the information on various layers to be transmitted on the transmission block, and the transmitting module is configured to transmit the interleaved information on a layer corresponding to the Physical Uplink Shared Channel (PUSCH);

wherein the information on various layers includes uplink control signaling information, or the information on various layers includes the data information and the uplink control signaling information.

The uplink control signaling needed to be transmitted comprises any one or more of the following information: an Acknowledgement or Negative Acknowledgement response message, and rank indication information and channel state information;

the encoding module is further configured to generate an Acknowledgement or Negative Acknowledgement response message logic unit, a rank indication information logic unit and a channel state information logic unit in a form of modulation symbols from the encoded uplink control signaling and data information corresponding to the transmission block;

the system further comprises a multiplexing module and/or a mapping module; wherein, the multiplexing module is configured to obtain a new data information logic unit according to the channel state information logic unit; and the mapping module is configured to obtains a new data information logic unit according to the channel state information logic unit.

The system further comprises a selecting module, configured to select a target transmission block for transmitting the uplink control signaling;

the multiplexing module is configured to obtain the new data information logic unit according to the channel state information logic unit by the following mode: when there is data transmission on the target transmission block, multiplexing the data information logic unit and the channel state information logic unit corresponding to the target transmission block, to obtain a new data information logic unit; and the mapping module is configured to obtain the new data information logic unit according to the channel state information logic unit by the following mode: when there is no data transmission on the target transmission block, mapping the channel state information logic unit corresponding to the target transmission block, to obtain a new data information logic unit.

The interleaving module is configured to interleave the information on various layers to be transmitted on the transmission block by the following mode: performing channel interleaving on the Acknowledgement or Negative Acknowledgement response message logic unit, the rank indication information logic unit and the new data information logic unit which are on the transmission block, to obtain an interleaved control and/or data information bit sequence.

The system further comprises a selecting module, configured to select a target transmission block for transmitting the uplink control signaling;

the transmitting module is configured to transmit the interleaved data information on a layer corresponding to the PUSCH:

if only one transmission block has data transmission, the transmitting module transmitting the control and/or data information bit sequence on the target transmission block on the layer corresponding to the PUSCH; and if two transmission blocks are configured at present, the transmitting module transmitting the control and/or data information bit sequence on the target transmission block and data information bit sequence corresponding to another transmission block on the layer corresponding to the PUSCH.

The interleaving module comprises a matrix generating unit, a data writing unit and a data readout unit; wherein, the matrix generating unit is configured to when a number of corresponding transmission layers M=2 while the transmission block is transmitted on the PUSCH, generate an Acknowledgement or Negative Acknowledgement response message logic block unit, a rank indication information logic block unit and a new data information logic block unit according to the Acknowledgement or Negative Acknowledgement response message logic unit, the rank indication information logic unit and the new data information logic unit; and generate one virtual matrix according to the rank indication logic block unit and the new data information logic block unit;

the data writing unit is configured to first write elements in the rank indication information logic block unit into preset locations of the virtual matrix in a descending order of row numbers progressively from a last row of the virtual matrix row by row, and then write elements in the new data information logic block unit into the virtual matrix in an ascending order of row numbers progressively from a first row of the virtual matrix row by row, wherein, locations where the rank indication information logic block units are written are skipped; and finally, write the elements in the Acknowledgement or Negative Acknowledgement response message logic block unit into the preset locations of the virtual matrix in a descending order of row numbers progressively from the last row of the virtual matrix progressively row by row; and the data readout unit is configured to read out the elements in the matrix progressively from a first column of the virtual matrix column by column, wherein, for each column, the elements are read out in an ascending order of row numbers in turn progressively, and for each element, it is read out by means of a bit sequence, to finally obtain a control and/or data information bit sequence.

The interleaving module comprises a matrix generating unit, a data writing unit and a data readout unit; wherein, the matrix generating unit is configured to when a number of corresponding transmission layers M=2 while the transmission block is transmitted on the PUSCH, generate two virtual matrixes according to a total number of the rank indication information logic unit and the new data information logic unit, which are a first virtual matrix and a second virtual matrix respectively; and the data writing unit is configured to when writing data into the first virtual matrix, first write first location elements in the rank indication information logic unit into preset locations of the first virtual matrix in a descending order of row numbers progressively from a last row of the first virtual matrix row by row, and then write first location elements in the new data information logic unit into the first virtual matrix in an ascending order of row numbers progressively from a first row of the first virtual matrix row by row, wherein, locations where the rank indication information logic units are written are skipped; and finally, write first location elements in the Acknowledgement or Negative Acknowledgement response message logic unit into the preset locations of the first virtual matrix in a descending order of row numbers progressively from the last row of the first virtual matrix row by row; and when writing data into the second virtual matrix, first write second location elements in the rank indication information logic unit into preset locations of the second virtual matrix in a descending order of row numbers progressively from a last row of the second virtual matrix row by row, and then write second location elements in the new data information logic unit into the second virtual matrix in an ascending order of row numbers progressively from a first row of the second virtual matrix row by row, wherein, locations where the rank indication information logic units are written are skipped; and finally, write second location elements in the Acknowledgement or Negative Acknowledgement response message logic unit the preset locations of the second virtual matrix in a descending order of row numbers progressively from the last row of the second virtual matrix;

the data readout unit is configured to read out data in the virtual matrix, for each virtual matrix, read out the elements in the matrix progressively from a first column of the virtual matrix column by column, wherein, for each column, the elements are read out in an ascending order of row numbers in turn progressively, in the read out elements, elements read out from the first virtual matrix constitute first location elements in the control information and/or data information logic unit, and elements read out from the second virtual matrix constitute second location elements in the control information and/or data information logic unit, and for each element, it is read out by means of a bit sequence, to finally obtain a control and/or data information bit sequence.

The interleaving module comprises a matrix generating unit, a data writing unit and a data readout unit; wherein, the matrix generating unit is configured to when a number of corresponding transmission layers M=2 while the transmission block is transmitted on the PUSCH, generate one virtual matrix according to a total number of the rank indication information logic unit and the new data information logic unit; and the data writing unit is configured to when writing data into the virtual matrix, write first location elements in the various logic units into the virtual matrix according to the following mode: first writing the first location elements in the rank indication information logic unit into preset locations of the virtual matrix every one row from a last but one row of the virtual matrix, and then writing first location elements in the new data information logic unit into the virtual matrix every one row from a first row of the virtual matrix, wherein, locations where the rank indication information logic units are written are skipped, and finally, writing the first location elements in the Acknowledgement or Negative Acknowledgement response message logic unit into the preset locations of the virtual matrix every one row from a last but one row of the virtual matrix; and write second location elements in the various logic units into the virtual matrix according to the following mode: first writing the second location elements in the rank indication information logic unit into preset locations of the virtual matrix every one row from a last row of the virtual matrix, and then writing second location elements in the new data information logic unit into the virtual matrix every one row from a second row of the virtual matrix, wherein, when writing data, locations where the rank indication information logic units are written are skipped, and finally, writing the second location elements in the Acknowledgement or Negative Acknowledgement response message logic unit into the preset locations of the virtual matrix every one row from a last row of the virtual matrix; and the data readout unit is further configured to when data in the virtual matrix is read out, read out the elements in the matrix from a first column of the virtual matrix progressively, wherein, for each column, the elements are read out in an ascending order of row numbers in turn progressively, and for each element, it is read out by means of a bit sequence, to finally obtain a control and/or data information bit sequence.

The interleaving module comprises a matrix generating unit, a data writing unit and a data readout unit; wherein, the matrix generating unit is configured to when a number of corresponding transmission layers is 1 while the transmission block is transmitted on the PUSCH, generate one virtual matrix according to a total number of the rank indication information logic unit and the new data information logic unit; and the data writing unit is configured to when writing data into the virtual matrix, first write elements in the rank indication information logic unit into preset locations of the virtual matrix in a descending order of row numbers progressively from a last row of the virtual matrix row by row, and then write elements in the new data information logic unit into the virtual matrix in an ascending order of row numbers progressively from a first row of the virtual matrix row by row, wherein, locations where the rank indication information logic units are written are skipped, and finally, write the elements in the Acknowledgement or Negative Acknowledgement response message logic unit into the preset locations of the virtual matrix in turn in a descending order of row numbers progressively from the last row of the virtual matrix row by row; and the data readout unit is configured to read out the elements in the matrix progressively from a first column of the virtual matrix column by column, wherein, for each column, the elements are read out in an ascending order of row numbers in turn progressively, and for each element, it is read out by means of a bit sequence, to finally obtain a control and/or data information bit sequence.

The selecting module is configured to select the target transmission block for transmitting the uplink control signaling by the following mode:

if two transmission blocks are configured and there are corresponding data information on both transmission blocks, a mode of selecting the target transmission block is any one of the following modes:

fixing the target transmission block to a first transmission block or a second transmission block;

selecting the target transmission block according to a signaling indication;

selecting a transmission block with a larger modulation encoding index as the target transmission block; and selecting a transmission block with a larger transmission block size and a larger ratio of the resources which are occupied by the transmission block as the target transmission block;

if two transmission blocks are configured and there is corresponding data information on only one transmission block, the target transmission block is a transmission block with no corresponding data information; and if one transmission block is configured, the target transmission block is the transmission block.

In conclusion, the present invention provides a system and method for transmitting uplink control signaling on a physical uplink shared channel, which can enable transmitting uplink control signaling on the PUSCH while the PUSCH uses spatial division multiplexing in a LTE-A system.

PREFERRED EMBODIMENTS OF THE PRESENT INVENTION

As described above, for the specific scheme that control signaling and uplink data are transmitted on the PUSCH at the same time when the PUSCH uses the spatial division multiplexing, the existing technologies do not give the scheme. For the above-described problem, the present invention proposes a system and method for transmitting uplink control signaling on the PUSCH.

The present invention will be described in detail in conjunction with accompanying drawings hereinafter.

Figure 4:
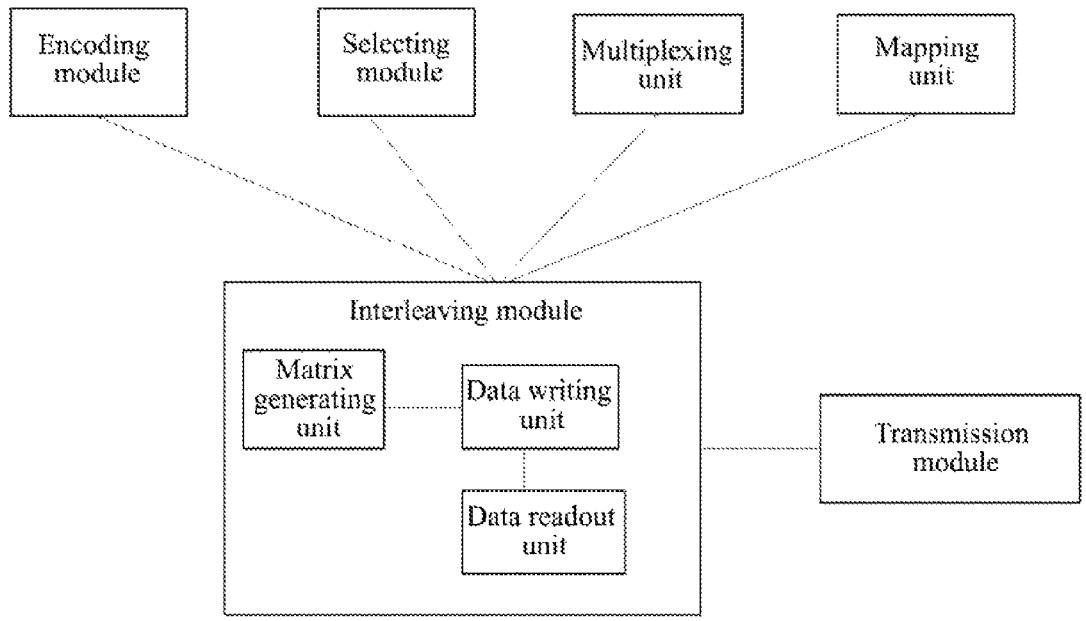
FIG. 4 is a structural diagram of a system embodiment according to the present invention.

The present embodiment provides a system for transmitting uplink control signaling on the PUSCH. As shown in FIG. 4, the system comprises an encoding module, a selecting module, an interleaving module and a transmitting module, and the system can further comprise a multiplexing module and/or a mapping module, wherein, the encoding module is configured to encode the uplink control signaling needed to be transmitted and data information corresponding to a transmission block and truncate the corresponding encoded information to obtain an encoded bit sequence; and write the bit sequence corresponding to the uplink control signaling and the data information bit sequence corresponding to the target transmission block into a form of modulation symbols according to a modulation mode of the target transmission block;

the uplink control signaling comprises any one or more of the following information: an Acknowledgement/Negative Acknowledgement (ACK/NACK) response message, Rank Indication (RI) information and channel state information (CQI/PMI); and the form of modulation symbols corresponding to the uplink control signaling comprises an ACK/NACK response message logic unit, a rank indication information logic unit and a channel state information logic unit, and the form of the modulation symbols corresponding to the data information bit sequence is the data information logic unit corresponding to the target transmission block.

the selecting module is configured to select a target transmission block for transmitting the uplink control signaling, which specifically refers to:

(A) If two transmission blocks are configured and both transmission blocks have corresponding data information thereon, selecting the target transmission block comprises the following four methods:

(A1) Fixing the target transmission block to a first transmission block or a second transmission block;

(A2) Selecting the target transmission block according to the signaling indication;

(A3) Selecting a transmission block with a larger modulation encoding index as the target transmission block according to the modulation encoding index of the transmission block; and the transmission block with a larger modulation encoding index corresponds to better channel quality.

(A4) Selecting a transmission block with a larger transmission block size and a larger ratio of the resources which are occupied by the transmission block as the target transmission block according to a transmission block size and a ratio of the resources which are occupied by the transmission block;

Wherein, if there is a transmission block that is a re-transmitted transmission block, a modulation encoding index of the transmission block can be equal to a modulation encoding index when the transmission block is first transmitted.

(B) If one transmission block is configured, the target transmission block is the transmission block.

(C) If two transmission blocks are configured and there is corresponding data information on only one transmission block, the target transmission block is a transmission block with no corresponding data information.

The multiplexing module is configured to when there is data transmission on the target transmission block, multiplex the data information logic unit and the channel state information (CQI/PMI) logic unit corresponding to the target transmission block, to obtain a new data information logic unit; which specifically comprises: first placing the channel state logic unit on the new data information logic unit, and then placing the data information logic unit corresponding to the target transmission block on the new data information logic unit, wherein, a length of the obtained new data information logic unit is a sum of the lengths of the channel state information logic unit and the data information logic unit.

The mapping module is configured to when there is no data transmission on the target transmission block, map the channel state information (CQI/PMI) logic unit corresponding to the target transmission block to a new data information logic unit, which is a channel state information logic unit.

The interleaving module is configured to when one transmission block corresponds to a plurality of layers, interleave the encoded information on various layers to be transmitted on the transmission block; i.e., performing channel interleaving on the ACK/NACK response message logic unit, the rank indication information logic unit and the new data information logic unit which are on the target transmission block, to obtain a control/data information bit sequence.

The interleaving module comprises a matrix generating unit, a data writing unit and a data readout unit; specifically, the matrix generating unit is configured to when a number of corresponding transmission layers M=1 and/or M=2 while the target transmission block is transmitted on the PUSCH, generate one virtual matrix according to the rank indication information logic unit and the new data information logic unit; wherein, a number of elements of the new data information logic unit is set as $H'_1$, a number of elements of the rank indication information logic unit is set as $Q'_{RI}$, and a product of a row number and a column number of the generated virtual matrix is $(H'_1+Q'_{RI})$; when the sub-frame uses a normal cyclic prefix structure, the column number of the virtual matrix is 12; when the sub-frame uses an extended cyclic prefix structure, the column number of the virtual matrix is 10; and if there is a SRS needed to be transmitted, when the sub-frame uses the normal cyclic prefix structure, the column number of the virtual matrix is 11; and when the sub-frame uses the extended cyclic prefix structure, the column number of the virtual matrix is 9.

The matrix generating unit can be further configured to when a number of corresponding transmission layers M=2 while the target transmission is transmitted on the PUSCH, generate one virtual matrix according to a total number of the rank indication information logic block unit and the new data information logic block unit; wherein, a number of the elements of the rank indication information logic block unit is set as $M_{RI}$, a number of the elements of the new data information logic block unit is set as M, a product of a row number and a column number of the generated virtual matrix is $(M+M_{RI})$; when the sub-frame uses a normal cyclic prefix structure, the column number of the virtual matrix is 12; when the sub-frame uses an extended cyclic prefix structure, the column number of the virtual matrix is 10; and if there is a SRS needed to be transmitted, when the sub-frame uses the normal cyclic prefix structure, the column number of the virtual matrix is 11; and when the sub-frame uses the extended cyclic prefix structure, the column number of the virtual matrix is 9.

The matrix generating unit can be further configured to when a number of corresponding transmission layers M=2 while the target transmission is transmitted on the PUSCH, generate two virtual matrixes according to a total number of the rank indication information logic unit and the new data information logic unit, which are a first virtual matrix and a second virtual matrix respectively; and a number of the elements of the new data information logic unit is set as $H'_1$, a number of the elements of the rank indication information logic unit is set as $Q'_{RI}$, and a product of a row number and a column number of each generated virtual matrix is $(H'_1+Q'_{RI})/2$, when the sub-frame uses a normal cyclic prefix structure, the column number of each virtual matrix is 12; when the sub-frame uses an extended cyclic prefix structure, the column number of each virtual matrix is 10; and if there is a SRS needed to be transmitted, when the sub-frame uses the normal cyclic prefix structure, the column number of each virtual matrix is 11; and when the sub-frame uses the extended cyclic prefix structure, the column number of each virtual matrix is 9.

The data writing unit is configured to write the elements in the rank indication information logic block unit, the elements in the new data information logic block unit, and the elements in the Acknowledge/Negative Acknowledge response message logic block unit into the generated virtual matrix, which specifically comprises:

(1) when a number of corresponding transmission layers M=1 while the target transmission block is transmitted on the PUSCH, the data writing unit first writing elements in the rank indication information logic block unit into preset locations of the virtual matrix in a descending order of row numbers progressively from a last row of the virtual matrix row by row, and then writing elements in the new data information logic block unit into the virtual matrix in an ascending order of row numbers progressively from a first row of the virtual matrix row by row, wherein, locations where the rank indication information logic block units are written are skipped; and finally, writing the elements in the Acknowledgement or Negative Acknowledgement response message logic block unit the preset locations of the virtual matrix in turn in a descending order of row numbers progressively from the last row of the virtual matrix row by row.

(2) when a number of corresponding transmission layers M=2 and the generated matrix has a size of $(M+M_{RI})$ while the target transmission block is transmitted on the PUSCH, the data writing unit first writing elements in the rank indication information logic block unit into preset locations of the virtual matrix in a descending order of row numbers progressively from a last row of the virtual matrix row by row, and then writing elements in the new data information logic block unit into the virtual matrix in an ascending order of row numbers progressively from a first row of the virtual matrix row by row, wherein, locations where the rank indication information logic block units are written are skipped; and finally, writing the elements in the Acknowledgement or Negative Acknowledgement response message logic block unit into the preset locations of the virtual matrix in a descending order of row numbers progressively from the last row of the virtual matrix row by row.

(3) when a number of corresponding transmission layers M=2 and two matrixes with an equal size are generated while the target transmission block is transmitted on the PUSCH, the data writing unit first writing first location elements in the rank indication information logic unit into preset locations of the first virtual matrix in a descending order of row numbers progressively from a last row of the first virtual matrix row by row, and writing second location elements in the rank indication information logic unit into preset locations of the second virtual matrix according to a rule row by row, and then writing first location elements in the new data information logic unit into the first virtual matrix in an ascending order of row numbers progressively from a first row of the first virtual matrix row by row, wherein, when writing the data, locations where the rank indication information logic units are written are skipped; and finally, writing second location elements in the new data information logic unit into the second virtual matrix in turn; and finally, writing first location elements in the Acknowledgement or Negative Acknowledgement response message logic unit into the preset locations of the first virtual matrix in a descending order of row numbers progressively from the last row of the first virtual matrix row by row; and writing the second location elements in the Acknowledgement or Negative Acknowledgement response message logic unit into the preset locations of the second virtual matrix according to a rule row by row.

(4) when a number of corresponding transmission layers M=2 and the generated matrix has a size of $(H'_1+Q'_{RI})$ while the target transmission block is transmitted on the PUSCH, the data writing unit first writing first location elements in the various logic units into the virtual matrix according to the following mode: first writing the first location elements in the rank indication information logic unit into preset locations of the virtual matrix every one row from a last but one row of the virtual matrix, and then writing first location elements in the new data information logic unit into the virtual matrix every one row from a first row of the virtual matrix, wherein, when writing the data, locations where the rank indication information logic units are written are skipped; and finally, writing the first location elements in the Acknowledgement or Negative Acknowledgement response message logic unit the preset locations of the virtual matrix every one row from a last but one row of the virtual matrix; and the data writing unit writing second location elements in the various logic units into the virtual matrix according to the following mode: first writing the second location elements in the rank indication information logic unit into preset locations of the virtual matrix every one row from a last row of the virtual matrix, and then writing second location elements in the new data information logic unit into the virtual matrix every one row from a second row of the virtual matrix, wherein, when writing the data, locations where the rank indication information logic units are written are skipped; and finally, writing the second location elements in the Acknowledgement or Negative Acknowledgement response message logic unit into the preset locations of the virtual matrix every one row from a last row of the virtual matrix.

the data readout unit is configured to read out the data in the virtual matrix, which specifically comprises:

(1) when a number of corresponding transmission layers M=1 while the target transmission block is transmitted on the PUSCH, the data readout unit reads out the elements in the matrix progressively from a first column of the virtual matrix column by column, wherein, for each column, the elements are read out from top to bottom (i.e., in an ascending order of row numbers) in turn, and for each element, it is read out by means of a bit sequence, to finally obtain a control and/or data information bit sequence.

(2) when a number of corresponding transmission layers M=2 and the generated matrix has a size of $(M+M_{RI})$ while the target transmission block is transmitted on the PUSCH, the data readout unit reads out the elements in the matrix progressively from a first column of the virtual matrix column by column, wherein, for each column, the elements are read out from top to bottom (i.e., in an ascending order of row numbers) in turn, and for each element, it is read out by means of a bit sequence, to finally obtain a control and/or data information bit sequence.

(3) when a number of corresponding transmission layers M=2 and two matrixes with an equal size are generated while the target transmission block is transmitted on the PUSCH, for each virtual matrix, the data readout unit reads out the elements in the matrix progressively from a first column of the virtual matrix column by column, wherein, for each column, the elements are read out from top to bottom (i.e., in an ascending order of row numbers) in turn, in the read out elements, elements read out from the first virtual matrix constitute first location elements in the control information and/or data information logic unit, and elements read out from the second virtual matrix constitute second location elements in the control information and/or data information logic unit, and for each element, it is read out by means of a bit sequence, to finally obtain a control and/or data information bit sequence.

(4) when a number of corresponding transmission layers M=2 and the generated matrix has a size of $(H'_1+Q'_{RI})$ while the target transmission block is transmitted on the PUSCH, the data readout unit reads out the elements in the matrix in an ascending order of column rows progressively from a first column of the virtual matrix column by column, wherein, for each column, the elements are read out from top to bottom (i.e., in an ascending order of row numbers) in turn, and for each element, it is read out by means of a bit sequence, to finally obtain a control and/or data information bit sequence.

The transmitting module is configured to transmit the interleaved data information on a layer corresponding to the PUSCH, which specifically comprises:

(b1) if only one transmission block has data transmission, the transmitting module transmitting the control and/or data information bit sequence on the target transmission block on the layer corresponding to the PUSCH; and (b2) if two transmission blocks are configured at present, the transmitting module transmitting the control and/or data information bit sequence on the target transmission block and a data information bit sequence corresponding to another transmission block on the layer corresponding to the PUSCH respectively.

The existing technologies can be referred to for the specific operation of the transmission module.

The present embodiment provides a method for transmitting uplink control signaling on a physical uplink shared channel, comprising: respectively encoding the uplink control signaling needed to be transmitted and data information corresponding to a transmission block and truncating the corresponding encoded information according to a target length; and when one transmission block corresponds to a plurality of layers, interleaving the information on various layers to be transmitted on the transmission block, and transmitting the interleaved information on a layer corresponding to the Physical Uplink Shared Channel (PUSCH); wherein the information on various layers includes uplink control signaling information, or the information on various layers includes the data information and the uplink control signaling information.

Figure 5:
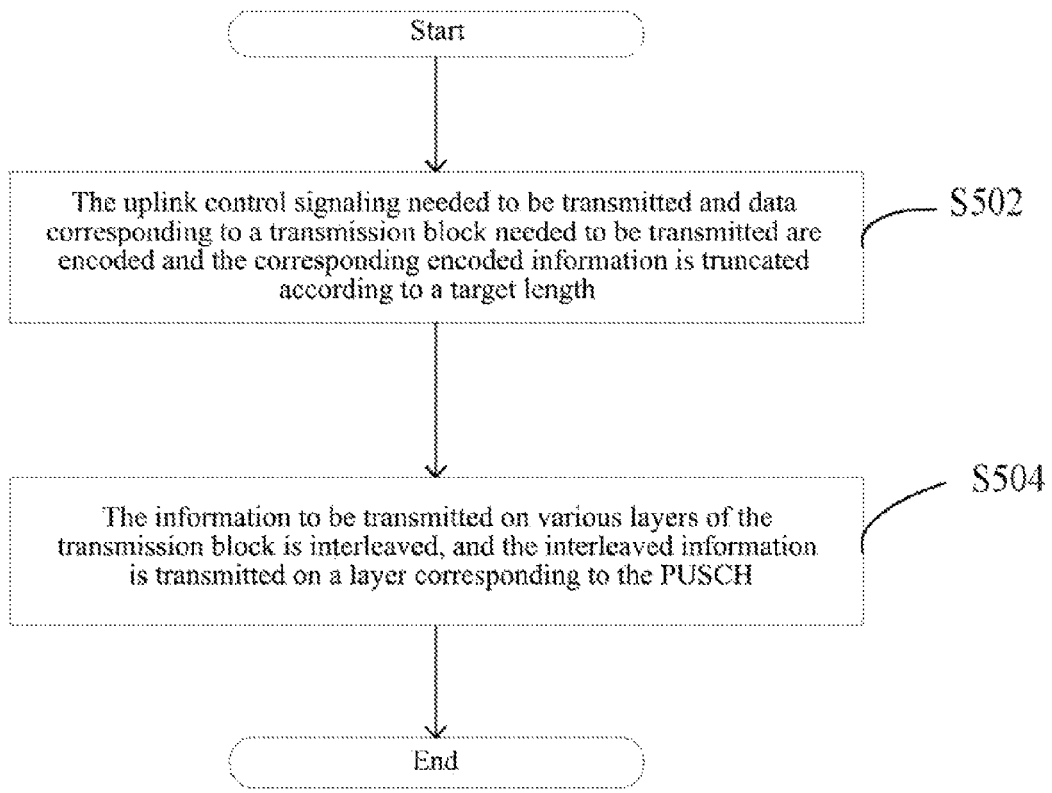
FIG. 5 is a flowchart of a method for transmitting uplink control signaling on a physical uplink shared channel according to an embodiment of the present invention.

As shown in FIG. 5, the method primarily comprises the following processes:

In step 502, the uplink control signaling needed to be transmitted and data information corresponding to a transmission block are respectively encoded and the corresponding encoded information is truncated according to a target length; wherein, there are one or two transmission blocks.

In step 504, the encoded information to be transmitted on various layers of the transmission block is interleaved, and the interleaved information is transmitted on a layer corresponding to the PUSCH.

In step 502, selecting a target transmission block for transmitting the uplink control signaling is also comprised;

selecting a target transmission block comprises the following several conditions:

(A) if two transmission blocks are configured and there are corresponding data information on both transmission blocks, selecting the target transmission block comprises the following four methods:

(A1) fixing the target transmission block to a first transmission block or a second transmission block;

(A2) selecting the target transmission block according to a signaling indication;

(A3) selecting a transmission block with a larger modulation encoding index as the target transmission block according to the modulation encoding index of the transmission block; wherein, the transmission block with a larger modulation encoding index corresponds to better channel quality.

(A4) selecting a transmission block with a larger transmission block size and a larger ratio of the resources which are occupied by the transmission block as the target transmission block according to the transmission block size and the resource ratio which are occupied by the transmission block;

wherein, if there is a transmission block which is a retransmitted transmission block, the modulation encoding index of the transmission block can be equal to a modulation encoding index when the transmission block is first transmitted.

(B) if one transmission block is configured, the target transmission block is the transmission block.

(C) if two transmission blocks are configured and there is corresponding data information on only one transmission block, the target transmission block is a transmission block with no corresponding data information; and the uplink control signaling comprises any one or more of the following information: an Acknowledgement/Negative Acknowledgement response message (ACK/NACK), Rank Indication (RI) information and channel state information (CQI/PMI);

encoding the uplink control signaling needed to be transmitted and data information corresponding to a transmission block and truncating the corresponding encoded information according to a target length to obtain the encoded bit sequence, i.e., respectively obtaining an Acknowledgement or Negative Acknowledgement response message bit sequence, a rank indication information bit sequence, a channel state information bit sequence and a data information bit sequence corresponding to the target transmission block; and according to the modulation mode of the target transmission block, writing the bit sequence corresponding to the uplink control signaling and the data information bit sequence corresponding to the target transmission block into a form of modulation symbols, i.e., respectively obtaining an Acknowledgement/Negative Acknowledgement response message logic unit, a rank indication information logic unit, a channel state information logic unit and a data information logic unit corresponding to the target transmission block.

Specifically, the encoding mode of the ACK/NACK response message and the RI information is that if the information is 1 bit, the encoded information is $[o_0, y]$ under the condition that the modulation mode is QPSK; the encoded information is $[o_0, y, x, x]$ under the condition that the modulation mode is 16QAM; the encoded information is $[o_0, y, x, x, x, x]$ under the condition that the modulation mode is 64QAM; wherein, $o_0$ represents the ACK/NACK response message or the RI information; if the information is 2 bits, the encoded information is $[o_0, o_1, o_2, o_0, o_1, o_2]$ under the condition that the modulation mode is QPSK; the encoded information is $[o_0, o_1, x, x, o_2, o_0, x, x, o_1, o_2, x, x]$ under the condition that the modulation mode is 16QAM; the encoded information is $[o_0, o_1, x, x, x, x, o_2, o_0, x, x, x, x, o_1, o_2, x, x, x]$ under the condition that the modulation mode is 64QAM; wherein, $o_0, o_1$ represents 2 bits of the ACK/NACK response message or the RI information, $o_2 = (o_0\ o_1)$, and x and y represent placeholders for maximizing an Eustachian distance of the modulation symbols during the scrambling; and as there is a condition that a number of the ACK/NACK response messages is larger than 2 bits, if the ACK/NACK response is larger than 2 bits, an encoding mode of the linear block codes is used for encoding, The specific encoding process is $$b_i = \sum_{n=0}^{O-1} (O_n \quad M_{i,n}) \bmod 2,$$

wherein, i=0, 1, 2, . . . , B−1, $b_0, b_1, b_2, \ldots, b_{B-1}$ represent the encoded bits, O represents a number of feedback information, B represents a length of the basic sequence, $M_{i,n}$ is a value with a number being i in the basic sequence n, $O_0, O_1, \ldots, O_{n-1}$ represent information before the encoding; and the present invention is described by example of B=32, but is not limited thereto, wherein, table 6 illustrates the basic sequence when B=32.

TABLE 6

The basic sequence of (32, O) code

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 1 | 0 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 0 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

Figure 1:
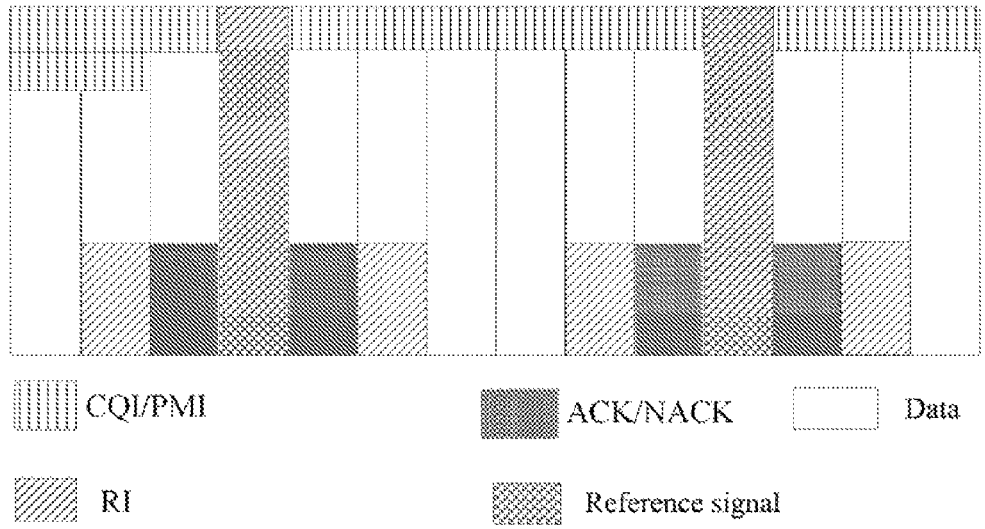
FIG. 1 is a diagram of multiplexing uplink control signaling with uplink data in a LTE system.
Figure 2:
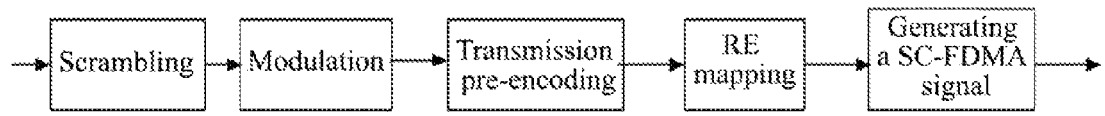
FIG. 2 is a diagram of transmission of a PUSCH in a LTE system.
Figure 3:
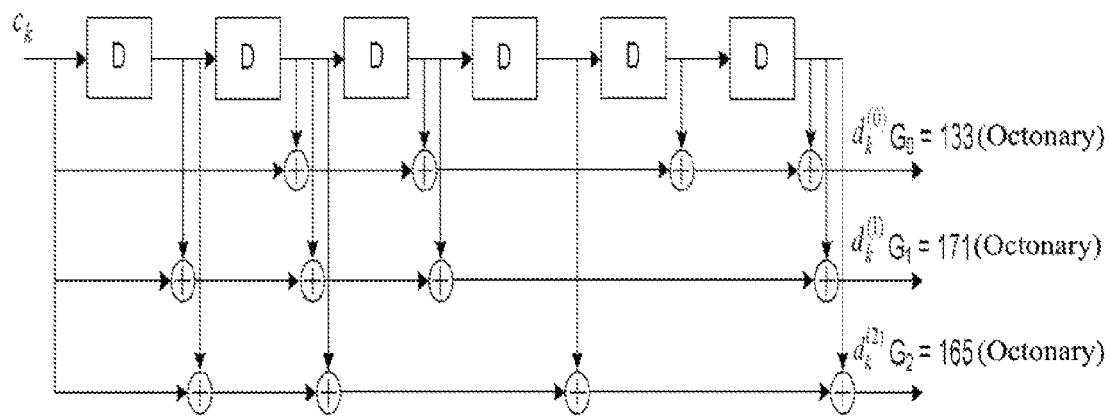
FIG. 3 is a diagram of a tailing convolution code with a length being 7 and a code rate being 1/3.

The encoding mode of the CQI/PMI information is that when a number of bits of the CQI/PMI is less than or equal to 11 bits, the CQI uses an encoding mode of linear block codes for encoding; and when a number of bits of the CQI/PMI is larger than 11 bits, a Cyclic Redundancy Check (CRC) with a length being 8 is first performed, and then an encoding mode of a tailing convolution code with a length being 7 and a code rate being 1/3 illustrated in FIG. 3 is used for encoding.

For the above various control signaling, the encoded information is encoded repeatedly, i.e., repeatedly encoding the encoded signaling again until the length thereof conforms to a target length, and the specific operation thereof is the same as the existing technologies, and the corresponding logic unit is obtained according to the modulation mode corresponding to the data.

The data encoding corresponding to the transmission block comprises a CRC check with a length of the transmission block being 24, a code block segmentation, and a CRC check with a length of the sub-block being 24, and a Turbo encoding with a code rate being 1/3 is used for channel encoding and rate matching, the corresponding encoded information is truncated according to the calculated target length, and the data information logic unit corresponding to the transmission block is obtained according to the corresponding modulation mode.

In step 504, the following operations are further performed before the interleaving:

(a1) if there is data transmission on the target transmission block, multiplexing the data information logic unit and the channel state information logic unit corresponding to the target transmission block, to obtain a new data information logic unit; and (a2) if there is no data transmission on the target transmission block, mapping the channel state information logic unit, to obtain a new data information logic unit.

Interleaving the information on various layers to be transmitted on the transmission block comprises: performing channel interleaving on the ACK/NACK response message logic unit, the rank indication information logic unit and the new data information logic unit which are on the transmission block, to obtain a control and/or data information bit sequence;

transmitting the interleaved information on a layer corresponding to the PUSCH comprises:

mode one: if there is only one transmission block, transmitting the control and/or data information bit sequence on the target transmission block on the layer corresponding to the PUSCH; and mode two: if there are two transmission blocks, transmitting the control and/or data information bit sequence on the target transmission block and a data information bit sequence corresponding to another transmission block on the layer corresponding to the PUSCH.

Wherein, multiplexing the data information logic unit and the channel state information (CQI/PMI) logic unit corresponding to the target transmission block refers to: first placing the channel state information logic unit on the new data information logic unit, and then placing the data information logic unit corresponding to the target transmission block on the new data information logic unit, wherein, a length of the obtained new data information logic unit is a sum of lengths of the channel state information logic unit and the data information logic unit; and when mapping the channel state information logic unit to obtain a new data information logic unit, the new data information logic unit is a channel state information logic unit.

Wherein, performing channel interleaving on the ACK/NACK response message logic unit, the rank indication information logic unit and the new data information logic unit, to obtain a control/data information logic unit comprises the following two conditions:

condition one: when a number of corresponding transmission layers M=1 while the target transmission block is transmitted on the PUSCH, generating one virtual matrix according to the rank indication information logic unit and the new data information logic unit, wherein, a number of the elements of the new data information logic unit is set as $H'_1$, a number of the elements of the rank indication information logic unit is set as $Q'_{RI}$, and a product of a row number and a column number of the generated virtual matrix is $(H'_1+Q'_{RI})$;

when the sub-frame uses a normal cyclic prefix structure, the column number of the virtual matrix is 12; when the sub-frame uses an extended cyclic prefix structure, the column number of the virtual matrix is 10; and if there is a Sounding Reference Signal (SRS) needed to be transmitted, when the sub-frame uses the normal cyclic prefix structure, the column number of the virtual matrix is 11; and when the sub-frame uses the extended cyclic prefix structure, the column number of the virtual matrix is 9.

when writing data, elements in the rank indication information logic unit are first written into preset locations of the virtual matrix in a descending order of row numbers progressively from a last row of the virtual matrix row by row (assume that the row number is n, i.e., the order to be written is row n, row n−1, row n−2, . . . , until the elements in the rank indication information logic unit are written totally), i.e., if the current sub-frame uses a normal cyclic prefix structure, writing the elements in the rank indication information logic unit into a virtual rectangular array with column numbers being 1, 4, 7 and 10 in the virtual matrix in turn according to rule, and if the current sub-frame uses an extended cyclic prefix structure, writing the elements in the elements in the rank indication information logic unit into a virtual rectangular array with column numbers being 0, 3, 5 and 8 in the virtual matrix in turn in a descending order of row numbers progressively according to a rule row by row; and then writing elements in the new data information logic unit into the virtual matrix in an ascending order of row numbers progressively from a first row of the virtual matrix row by row, wherein, locations where the rank indication information logic units are written are skipped; and finally, writing the elements in the Acknowledgement/Negative Acknowledgement response message logic unit into the preset locations of the virtual matrix in turn in a descending order of row numbers progressively from the last row of the virtual matrix row by row, i.e., if the current sub-frame uses a normal cyclic prefix structure, writing the elements in the Acknowledgement/Negative Acknowledgement response message logic unit into a rectangular array with column numbers being 2, 3, 8 and 9 in the matrix according to rule; and if the current sub-frame uses an extended cyclic prefix structure, writing the elements in the Acknowledgement/Negative Acknowledgement response message logic unit into a rectangular array with column numbers being 1, 2, 6 and 7 in the matrix in a descending order of row numbers progressively according to a rule row by row; and when reading out the data, the elements in the virtual matrix are read out from a first column of the matrix column by column, wherein, for each column, the elements are read out from top to bottom (i.e., in an ascending order of row numbers) in turn, and for each element, it is read out by means of a bit sequence, to finally obtain a control/data information bit sequence.

condition two: when a number of corresponding transmission layers M=2 while the target transmission is transmitted on the PUSCH, the following tow methods are comprised:

method one: first location elements in the ACK/NACK response message logic unit constituting first Acknowledgement/Negative Acknowledgement response message logic sub-unit, second location elements in the Acknowledgement or Negative Acknowledgement response message logic unit constituting second Acknowledgement/Negative Acknowledgement response message logic sub-unit, similarly, first location elements in the rank indication information logic unit constituting first rank indication information logic sub-unit, second location elements in the rank indication information logic unit constituting second rank indication information logic sub-unit, and first location elements in the new data information logic unit constituting first new data information logic sub-unit, second location elements in the new data information logic unit constituting second new data information logic sub-unit, and various logic sub-units constituting various logic block units, i.e., obtaining an ACK/NACK logic block unit, a rank indication information logic block unit and a new data information logic block unit.

The mode thereof is setting the first logic sub-unit as $[q_{10}, q_{11}, q_{12}, \ldots, q_{1m}]$ and the second logic sub-unit as $[q_{20}, q_{21}, q_{22}, \ldots, q_{2m}]$, and the generated logic block unit being $[q_0, q_1, q_2, \ldots, q_m]$, wherein, $q_i$ (i=1:m) is a matrix comprised of $q_{1i}$ and $q_{2i}$, wherein, $q_{1i}$ is a first row (or a first column) of matrix $q_i$, and $q_{2i}$ is a second row (or a second column) of matrix $q_i$.

then, generating one virtual matrix according to the rank indication information logic block unit and the new data information logic block unit, wherein, a number of the elements of the rank indication information logic block unit is set as $M_{RI}$, a number of the elements of the new data information logic block unit is set as M, and a product of a row number and a column number of the generated virtual matrix is $(M+M_{RI})$;

when the sub-frame uses a normal cyclic prefix structure, the column number of the virtual matrix is 12; when the sub-frame uses an extended cyclic prefix structure, the column number of the virtual matrix is 10; and if there is a SRS needed to be transmitted, when the sub-frame uses the normal cyclic prefix structure, the column number of the virtual matrix is 11; and when the sub-frame uses the extended cyclic prefix structure, the column number of the virtual matrix is 9.

when writing data, first writing elements in the rank indication information logic block unit into preset locations of the virtual matrix in a descending order of row numbers progressively from a last row of the virtual matrix row by row, i.e., if the current sub-frame uses a normal cyclic prefix structure, writing the elements in the rank indication information logic block unit into a virtual rectangular array with column numbers being 1, 4, 7 and 10 in the virtual matrix in turn according to rule row by row, and if the current sub-frame uses an extended cyclic prefix structure, writing the elements in the rank indication information logic block unit into a virtual rectangular array with column numbers being 0, 3, 5 and 8 in the virtual matrix according to a rule row by row; and then writing elements in the new data information logic block unit into the virtual matrix in an ascending order of row numbers progressively from a first row of the virtual matrix row by row, wherein, locations where the rank indication information logic block units are written are skipped; and finally, writing the elements in the Acknowledgement/Negative Acknowledgement response message logic block unit into the preset locations of the virtual matrix in a descending order of row numbers progressively from the last row of the virtual matrix row by row; i.e., if the current sub-frame uses a normal cyclic prefix structure, writing the elements in the Acknowledgement/Negative Acknowledgement response message logic block unit into a virtual rectangular array with column numbers being 2, 3, 8 and 9 in the virtual matrix according to rule row by row; and if the current sub-frame uses an extended cyclic prefix structure, writing the elements in the Acknowledgement/Negative Acknowledgement response message logic block unit into a virtual rectangular array with column numbers being 1, 2, 6 and 7 in the virtual matrix according to a rule row by row; and when reading out the data in the virtual matrix, the elements in the virtual matrix are read out progressively from a first column of the virtual matrix column by column, wherein, for each column, the elements are read out from top to bottom (i.e., in an ascending order of row numbers) in turn, and for each element, it is read out by means of a bit sequence, to finally obtain a control/data information bit sequence.

Method two: generating two virtual matrixes according to a total number of the rank indication information logic unit and the new data information logic unit, which are a first virtual matrix and a second virtual matrix respectively; and a number of the elements of the new data information logic unit is set as $H'_1$, a number of the elements of the rank indication information logic unit is set as $Q'_{RI}$, and a product of a row number and a column number of each generated virtual matrix is $(H'_1+Q'_{RI})/2$; when the sub-frame uses a normal cyclic prefix structure, the column number of each virtual matrix is 12; when the sub-frame uses an extended cyclic prefix structure, the column number of each virtual matrix is 10; and if there is a SRS needed to be transmitted, when the sub-frame uses the normal cyclic prefix structure, the column number of each virtual matrix is 11; and when the sub-frame uses the extended cyclic prefix structure, the column number of each virtual matrix is 9.

when writing data into the first virtual matrix, first writing first location elements in the rank indication information logic unit into preset locations of the first virtual matrix in a descending order of row numbers progressively from a last row of the first virtual matrix row by row, i.e., if the current sub-frame uses a normal cyclic prefix structure, writing the first location elements in the rank indication information logic unit into a virtual rectangular array with column numbers being 1, 4, 7 and 10 in the first virtual matrix according to rule row by row, and if the sub-frame uses an extended cyclic prefix structure, writing the first location elements in the elements in the rank indication information logic unit into a virtual rectangular array with column numbers being 0, 3, 5 and 8 in the first virtual matrix according to a rule row by row; and then writing first location elements in the new data information logic unit into the first virtual matrix in an ascending order of row numbers progressively from a first row of the first virtual matrix row by row, wherein, when writing the data, locations where the rank indication information logic units are written are skipped; and finally, writing first location elements in the Acknowledgement/Negative Acknowledgement response message logic unit into the preset locations of the first virtual matrix in a descending order of row numbers progressively from the last row of the first virtual matrix row by row; and i.e., if the sub-frame uses a normal cyclic prefix structure, writing the first location element in the Acknowledgement/Negative Acknowledgement response message logic unit into a rectangular array with column numbers being 2, 3, 8 and 9 in the first virtual matrix according to rule row by row; and if the sub-frame uses an extended cyclic prefix structure, writing the first location element in the Acknowledgement/Negative Acknowledgement response message logic block unit into a virtual rectangular array with column numbers being 1, 2, 6 and 7 in the virtual matrix according to a rule row by row, and when the Acknowledgement/Negative Acknowledgement response message is written, overlapping the existing data at the written location; and similarly, writing second location elements in the rank indication information logic unit into preset locations of the second virtual matrix according to a rule row by row; writing second location elements in the new data information logic unit into the second virtual matrix in turn; and writing second location elements in the Acknowledgement/Negative Acknowledgement response message logic unit into preset locations of the second virtual matrix according to a rule row by row.

When reading out the data, for each virtual matrix, reading out the elements in the virtual matrix from a first column of the virtual matrix column by column, wherein, for each column, the elements are read out from top to bottom (i.e., in an ascending order of row numbers) in turn, in the read out elements, elements read out from the first virtual matrix constitute first location elements in the control/data information logic unit, and elements read out from the second virtual matrix constitute second location elements in the control/data information logic unit, and for each element, it is read out by means of a bit sequence, to finally obtain a control/data information bit sequence.

Method Three:

generating one virtual matrix according to a rank indication logic unit and a new data information logic unit, wherein, a number of the elements of the new data information logic unit is set as $H'_1$, a number of the elements of the rank indication information logic unit is set as $Q'_{RI}$, and a product of a row number and a column number of the generated virtual matrix is $(H'_1+Q'_{RI})$; when the sub-frame uses a normal cyclic prefix structure, the column number of the virtual matrix is 12; when the sub-frame uses an extended cyclic prefix structure, the column number of the virtual matrix is 10; and if there is a SRS needed to be transmitted, when the sub-frame uses the normal cyclic prefix structure, the column number of the virtual matrix is 11; and when the sub-frame uses the extended cyclic prefix structure, the column number of the virtual matrix is 9.

when writing data into the virtual matrix, writing first location elements in the various logic units into the virtual matrix according to the following mode: first writing the first location elements in the rank indication information logic unit into preset locations of the virtual matrix every one row from a last but one row of the virtual matrix (i.e., the order to be written is row n−1, row n−3, . . . , until the first location elements in the rank indication information logic unit are written totally), then, writing first location elements in the new data information logic unit into the virtual matrix every one row from a first row of the virtual matrix (i.e., the order to be written is row 1, row 3, . . . , until the first location elements in the new data information logic unit are written totally), when writing data, locations where the rank indication information logic units are written are skipped, and finally, the first location elements in the Acknowledgement/Negative Acknowledgement response message logic unit are written into the preset locations of the virtual matrix every one row from a last but one row of the virtual matrix (i.e., the order to be written is row n−1, row n−3, . . . , until the first location elements in the Acknowledgement/Negative Acknowledgement response message logic unit are written totally);

when writing data into the virtual matrix, writing second location elements in the various logic units into the virtual matrix according to the following mode: first writing the second location elements in the rank indication information logic unit into preset locations of the virtual matrix every one row from a last row of the virtual matrix (i.e., the order to be written is row n, row n−2, . . . , until the second location elements in the rank indication information logic unit are written totally), then, writing second location elements in the new data information logic unit into the virtual matrix every one row from a second row of the virtual matrix (i.e., the order to be written is row 2, row 4, . . . , until the second location elements in the new data information logic unit are written totally), when writing data, locations where the rank indication information logic units are written are skipped; and finally, the second location elements in the Acknowledgement/Negative Acknowledgement response message logic unit are written into the preset locations of the virtual matrix every one row from a last row of the virtual matrix (i.e., the order to be written is row n, row n−2, . . . , until the second location elements in the Acknowledgement/Negative Acknowledgement response message logic unit are written totally);

when reading out the data, reading out the elements in the matrix in an ascending order of column numbers progressively from a first column of the virtual matrix column by column, wherein, for each column, the elements are read out from top to bottom (i.e., in an ascending order of row numbers) in turn, and for each element, it is read out by means of a bit sequence, to finally obtain a control/data information bit sequence.

The first location elements described in method one, method two and method three in the above conditions refer to a first half of the elements in the logic unit, and the second location elements refer to a second half of the elements in the logic unit; or the first location elements refer to a second half of the elements in the logic unit, and the second location elements refer to a first half of the elements in the logic unit; or when the element numbers in the logic unit are started from 0, the first location elements refer to even elements in the logic unit, and the second location elements refer to odd elements in the logic unit; or when the element numbers in the logic unit are started from 1, the first location elements refer to odd elements in the logic unit, and the second location elements refer to even elements in the logic unit.

Wherein, transmission on a layer corresponding to the PUSCH refers to after performing scrambling, modulating, layer mapping, transmission pre-encoding, and pre-encoding on the control/data information logic unit or the control/data logic unit and the data information logic unit, and mapping them to the physical resources, transmitting the physical resources to a base station through corresponding antenna ports.

The present invention will be described in detail with four embodiments hereinafter:

Embodiment One

Figure 6:
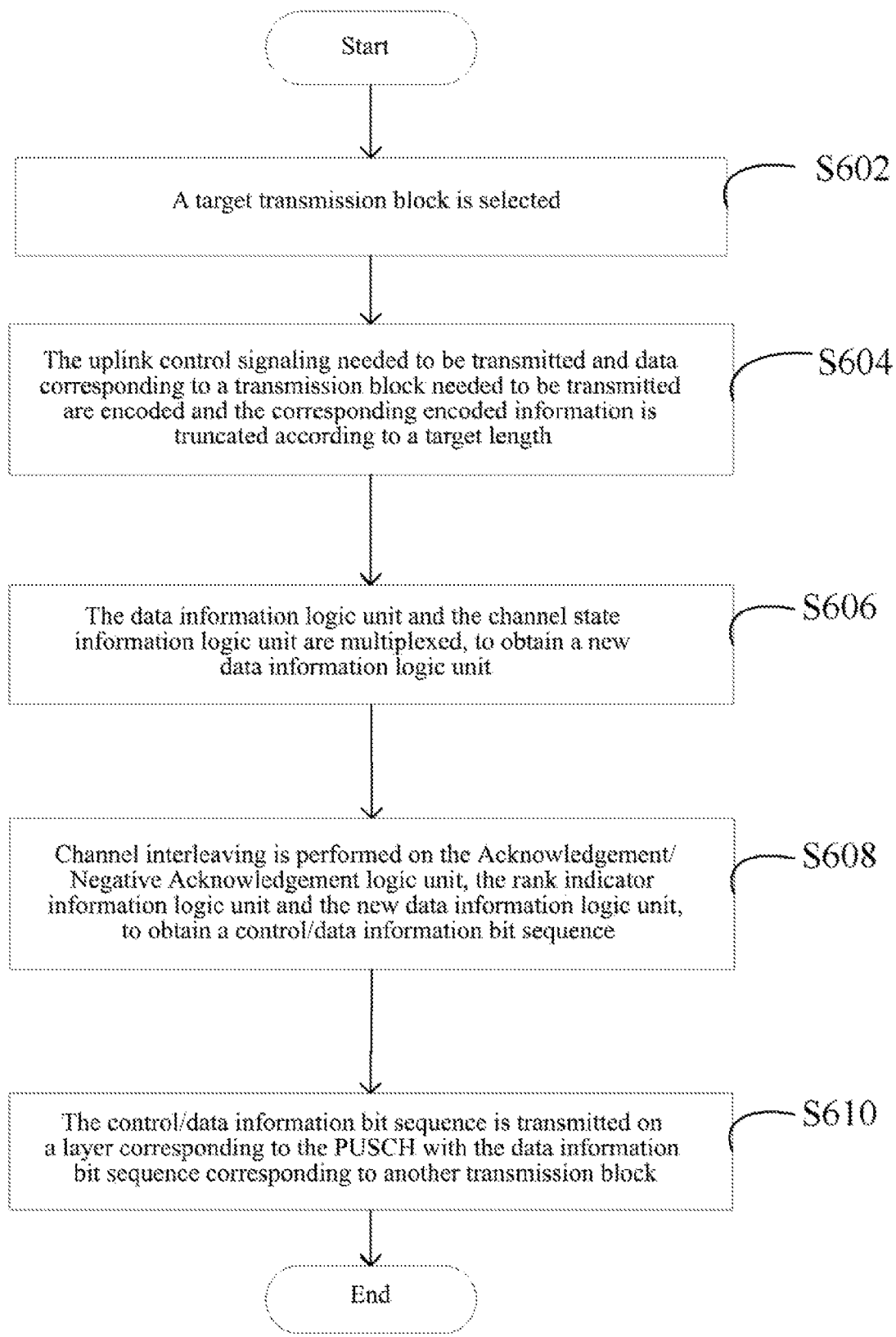
FIG. 6 is a flowchart according to embodiment one of the present invention.

The present invention corresponds to a condition where two transmission blocks are configured and there is data on each transmission block. FIG. 6 is a flowchart of embodiment one of a method for transmitting uplink control signaling on a physical uplink shared channel according to an embodiment of the present invention. As shown in FIG. 6, the method for transmitting uplink control signaling on a physical uplink shared channel according to an embodiment of the present invention primarily comprises the following processes (step S602 to step S610):

In step S602, a target transmission block is selected.

In step S604, the uplink control signaling needed to be transmitted and data corresponding to a transmission block are encoded and the corresponding encoded information is truncated according to a target length.

In step S606, the data logic unit and the channel state information logic unit corresponding to the target transmission block are multiplexed, to obtain a new data information logic unit.

In step S608, channel interleaving is performed on the ACK/NACK response message logic unit, the rank indication information logic unit and the new data logic unit, to obtain a control/data information bit sequence.

In step S610, after performing scrambling, modulating, layer mapping, transmission pre-encoding and pre-encoding on the control/data information bit sequence with a data bit sequence corresponding to another transmission block, and mapping the data bit sequence to physical resources, the physical resources are transmitted to a base station through corresponding antenna ports.

Various details of the above process will be further described by specific embodiments hereinafter.

Figure 7:
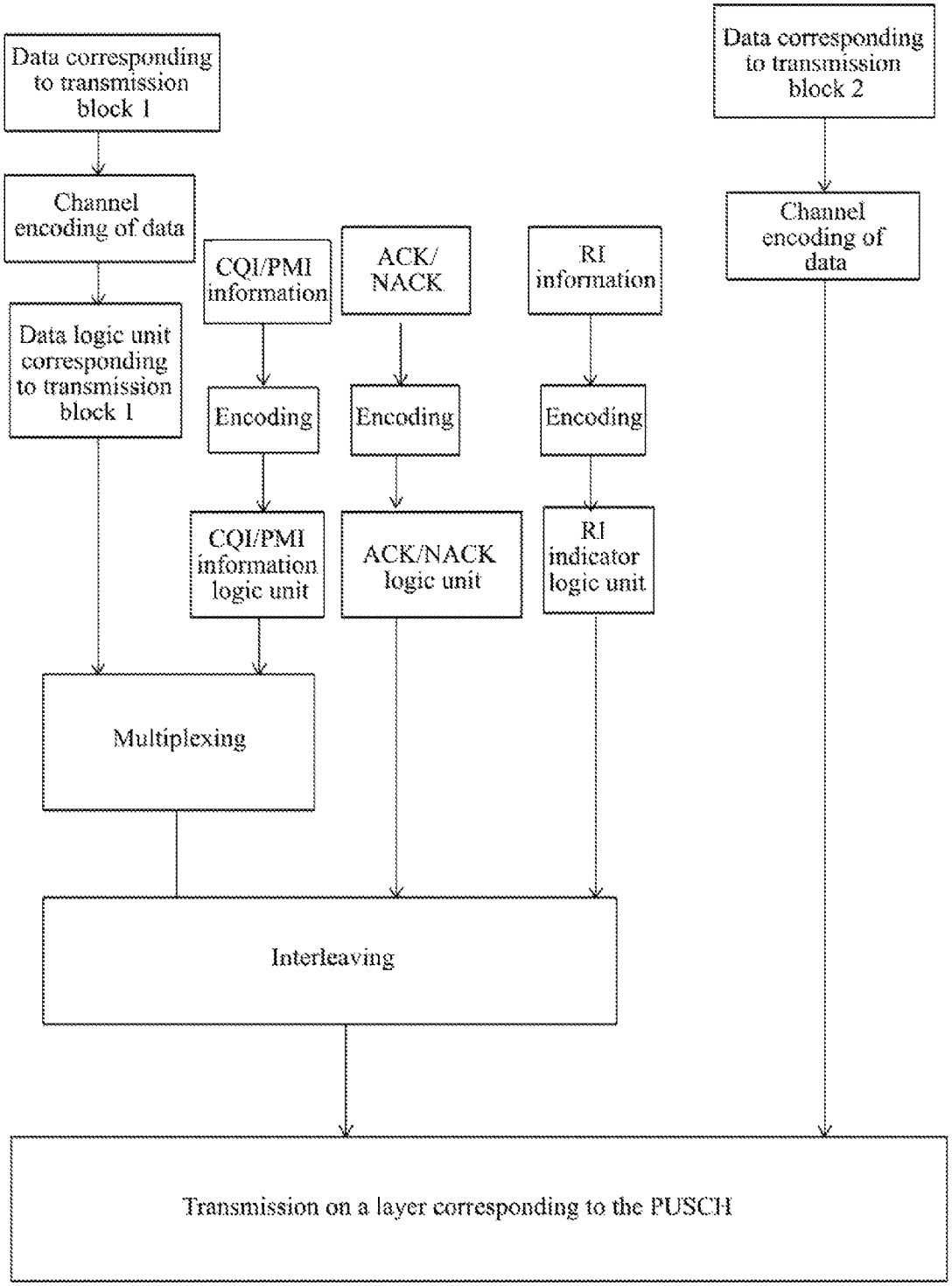
FIG. 7 is a diagram according to embodiment one of the present invention.

Application Example 1 assume that two transmission blocks TB1 and TB2 are configured and both transmission blocks have data transmitted thereon, wherein, TB1 corresponds to one transmission layer when being transmitted on the PUSCH, and the control signaling needed to be transmitted by the current sub-frame is $[O_0^{ACK}, O_1^{ACK}, \ldots O_3^{ACK}]$, $[O_0^{RI}, O_1^{RI}]$ and $[O_0^{CQI}, O_1^{CQI}, \ldots O_{10}^{CQI}]$, the current sub-frame is a normal cyclic prefix, the virtual rectangular array is numbered from 0, preset locations of the RI information have column numbers being 1, 10, 7 and 4, the preset locations of the ACK/NACK response message have column numbers being 2, 10, 8 and 3, and there is no SRS needed to be transmitted. The diagram of embodiment one is shown in FIG. 7, and the present invention will be described in detail in conjunction with a flowchart hereinafter:

Step 602 comprises the following several methods:

(1) transmitting the uplink control signaling on the TB1 fixedly;

(2) acquiring that the uplink control signaling needs to be transmitted on the TB1 according to a downlink signaling;

(3) selecting a transmission block with a larger modulation encoding index as the target transmission block, i.e., TB1, according to modulation encoding indexes $I_{MCS}^1$ and $I_{MCS}^2$ corresponding to two transmission blocks, wherein, $I_{MCS}^1 > I_{MCS}^2$;

(4) assuming that the TB2 is a retransmitted transmission block, and $I_{MCS}^1$ of the TB1 is larger than $I_{MCS}^2$ when the TB2 is first transmitted, the target transmission block is TB1;

(5) assuming that TB2 is a retransmitted codeword stream, as $I_{MCS}$ is not retransmitted during the retransmission, but sizes of two transmission blocks $TBS_1$, $TBS_2$ and the resources blocks $N_{PRB}^1$, $N_{PRB}^2$ which are occupied by the transmission blocks can be obtained, assuming that $TBS_1 > TBS_2$ and $N_{PRB}^1 = N_{PRB}^2$, as $TBS_1/N_{PRB}^1 > TBS_2/N_{PRB}^2$, the uplink control signaling is transmitted on the TB1, and the target transmission block is TB1.

In step 604, different encoding modes are selected according to an modulation mode $Q_m^1$ indicated by $I_{MCS}^1$ of the target transmission block which is TB1, encoding is performed on the ACK/NACK response message, RI information, CQI/PMI information respectively, encoded bit sequences which are $[q_0^{ACK}, q_1^{ACK}, q_2^{ACK}, \ldots, q_{Q_{ACK}-1}^{ACK}]$, $[q_0^{RI}, q_1^{RI}, q_2^{RI}, q_{Q_{RI}-1}^{RI}]$ and $[q_0^{CQI}, q_1^{CQI}, q_2^{CQI}, \ldots, q_{Q_{CQI}-1}^{CQI}]$ are obtained according to target lengths $Q_{ACK}$, $Q_{RI}$ and $Q_{CQI}$, and then the ACK/NACK response message logic unit is $[q_0^{ACK}, q_1^{ACK}, q_2^{ACK}, \ldots, q_{Q'_{ACK}-1}^{ACK}]$, the RI information logic unit is $[q_0^{RI}, q_1^{RI}, q_2^{RI}, \ldots, q_{Q'_{RI}-1}^{RI}]$, the CQI/PMI information logic unit is $[q_0^{CQI}, q_1^{CQI}, q_2^{CQI}, \ldots, q_{Q_{CQI}-1}^{CQI}]$, encoding is performed on the data information corresponding to the transmission block 1 and the transmission block 2, the bit sequence $[f_0^1, f_1^1, f_2^1, \ldots, f_{G_1-1}^1]$ of the transmission block 1 and the bit sequence $[f_0^2, f_1^2, f_2^2, \ldots, f_{G_2-1}^2]$ of the transmission block 2 are obtained according to target lengths $G_1$ and $G_2$, and then the data information logic unit corresponding to the target transmission block is $[f_0^1, f_1^1, f_2^1, \ldots, f_{G_1-1}^1]$.

In step 606, $[f_0^1, f_1^1, f_2^1, \ldots, f_{G_1-1}^1]$ and $[q_0^{CQI}, q_1^{CQI}, q_2^{CQI}, \ldots, q_{Q_{CQI}-1}^{CQI}]$ are multiplexed into a new data information logic unit in an order of first being written into the CQI/PMI information logic unit and then being written into the data information logic unit, to obtain $[g_0^1, g_1^1, g_2^1, \ldots, g_{H'_1-1}^1]$.

In S608, one virtual matrix is generated according to a total number of $(H'_1 + Q'_{RI})$; since the current sub-frame is a normal cyclic prefix, the column number of the virtual matrix is 12, and $[q_0^{RI}, q_1^{RI}, q_2^{RI}, \ldots, q_{Q'_{RI}-1}^{RI}]$ is written into preset locations of the virtual matrix in a descending order of row numbers progressively from a last row of the virtual matrix row by row, and then the new data information logic unit $[g_0^1, g_1^1, g_2^1, \ldots, g_{H'_1-1}^1]$ is written into the virtual matrix in an ascending order of row numbers progressively from a first row of the virtual matrix row by row; wherein, locations where the rank indication information logic units are written are skipped; and finally, $[q_0^{ACK}, q_1^{ACK}, q_2^{ACK}, \ldots, q_{Q'_{ACK}-1}^{ACK}]$ is written into preset locations of the virtual matrix in turn in a descending order of row numbers progressively from the last row of the virtual matrix row by row; and when being read out, the elements in the matrix are read out from a first column of the virtual matrix column by column, wherein, for each column, the elements are read out from top to bottom (i.e., in an ascending order of row numbers) in turn, and for each element, it is read out by means of a bit sequence, to finally obtain a control/data information bit sequence $[h_0^1, h_1^1, h_2^1, \ldots, h_{H_1+Q_{RI}-1}^1]$.

In step S610, $[f_0^2, f_1^2, f_2^2, \ldots, f_{G_2-1}^2]$ and $[h_0^1, h_1^1, h_2^1, \ldots, h_{H_1+Q_{RI}-1}^1]$ are transmitted on a layer corresponding to the PUSCH.

Application Example 2 assume that two transmission blocks TB1 and TB2 are configured and both transmission blocks have corresponding data transmitted thereon, wherein, TB1 corresponds to two transmission layers when being transmitted on the PUSCH, and the control signaling needed to be transmitted by the current sub-frame is $[O_0^{ACK}, O_1^{ACK}, \ldots O_3^{ACK}]$, $[O_0^{RI}, O_1^{RI}]$ and $[O_0^{CQI}, O_1^{CQI}, \ldots O_{10}^{CQI}]$, the current sub-frame is a normal cyclic prefix, there is no SRS to be transmitted, the virtual rectangular array is numbered from 0, preset locations of the RI information have column numbers being 1, 10, 7 and 4, the preset locations of the ACK/NACK response message have column numbers being 2, 10, 8 and 3, and the elements in the logic unit are numbered from 1. The diagram of embodiment one is shown in FIG. 7, and the present invention will be described in detail in conjunction with a flowchart hereinafter:

In step 602, this step is the same as step 602 in the application example 1, which will not be repeated further.

In step 604, different encoding modes are selected according to an modulation mode $Q_m^1$ indicated by $I_{MCS}^1$ of the target transmission block which is TB1, encoding is performed on the ACK/NACK response message, RI information, CQI/PMI information respectively, encoded bit sequences which are $[q_0^{ACK}, q_1^{ACK}, q_2^{ACK}, \ldots, q_{Q_{ACK}-1}^{ACK}]$, $[q_0^{RI}, q_1^{RI}, q_2^{RI}, \ldots, q_{Q_{RI}-1}^{RI}]$ and $[q_0^{CQI}, q_1^{CQI}, q_2^{CQI}, \ldots, q_{Q_{CQI}-1}^{CQI}]$ are obtained according to target lengths $Q_{ACK}$, $Q_{RI}$ and $Q_{CQI}$, and then the ACK/NACK response message logic unit is $[q_0^{ACK}, q_1^{ACK}, q_2^{ACK}, \ldots, q_{Q'_{ACK}-1}^{ACK}]$, the RI information logic unit is $[q_0^{RI}, q_1^{RI}, q_2^{RI}, \ldots, q_{Q'_{RI}-1}^{RI}]$, the CQI/PMI information logic unit is $[q_0^{CQI}, q_1^{CQI}, q_2^{CQI}, \ldots, q_{Q_{CQI}-1}^{CQI}]$, encoding is performed on the data information corresponding to the transmission block 1 and the transmission block 2, $[f_0^1, f_1^1, f_2^1, \ldots, f_{G_1-1}^1]$ and $[f_0^2, f_1^2, f_2^2, \ldots, f_{G_2-1}^2]$ are obtained according to target lengths $G_1$ and $G_2$, and then the data information logic unit corresponding to the target transmission block is $[f_0^1, f_1^1, f_2^1, \ldots, f_{G_1-1}^1]$.

In step 606, $[f_0^1, f_1^1, f_2^1, \ldots, f_{G_1-1}^1]$ and $[q_0^{CQI}, q_1^{CQI}, q_2^{CQI}, \ldots, q_{Q_{CQI}-1}^{CQI}]$ are multiplexed into a new data information logic unit in an order of first being written into the CQI/PMI information logic unit and then being written into the data information logic unit, to obtain $[g_0^1, g_1^1, g_2^1, \ldots, g_{H'_1-1}^1]$.

In step S608, the step comprises 3 methods:

method one: odd elements in $[q_0^{ACK}, q_1^{ACK}, q_2^{ACK}, \ldots, q_{Q'_{ACK}-1}^{ACK}]$ constituting a first ACK/NACK response message logic sub-unit $[q_{10}^{ACK}, q_{11}^{ACK}, q_{12}^{ACK}, \ldots, q_{1m_{ACK}}^{ACK}]$, even elements in $[q_0^{ACK}, q_1^{ACK}, q_2^{ACK}, \ldots, q_{Q'_{ACK}-1}^{ACK}]$ constituting a second ACK/NACK response message logic sub-unit $[q_{20}^{ACK}, q_{21}^{ACK}, q_{22}^{ACK}, \ldots, q_{2n_{ACK}}^{ACK}]$ ($m_{ACK} + n_{ACK} = Q'_{ACK}$), constituting $[q_{10}^{ACK}, q_{11}^{ACK}, q_{12}^{ACK}, \ldots, q_{1m_{ACK}}^{ACK}]$ and $[q_{20}^{ACK}, q_{21}^{ACK}, q_{22}^{ACK}, \ldots, q_{2n_{ACK}}^{ACK}]$ into an ACK/NACK logic block unit $[q_0^{ACK}, q_1^{ACK}, q_2^{ACK}, \ldots, q_{M_{ACK}}^{ACK}]$ and similarly, obtaining a rank indication information logic block unit $[q_0^{RI}, q_1^{RI}, q_2^{RI}, \ldots, q_{M_{RI}}^{RI}]$, a new data information logic block unit $[g_0^1, g_1^1, g_2^1, \ldots, g_M^1]$; and generating one virtual matrix according to a total number (M+$M_{RI}$); since the current sub-frame is a normal cyclic prefix, a column number of the virtual matrix is 12, and when data is written, first writing [$q_0^{RI}$, $q_1^{RI}$, $q_2^{RI}$, ..., $q_{M_{RI}}^{RI}$] into preset locations of the virtual matrix in a descending order of row numbers progressively from a last row of the virtual matrix row by row; then writing the new data information logic unit [$\underline{g}_0^1$, $\underline{g}_1^1$, $\underline{g}_2^1$, ..., $\underline{g}_M^1$] into the virtual matrix in an ascending order of row numbers progressively from a first row of the virtual matrix row by row, wherein, locations where the rank indication information logic block units are written are skipped; and finally, writing the elements [$q_0^{ACK}$, $q_1^{ACK}$, $q_2^{ACK}$, ..., $q_{M_{ACK}}^{ACK}$] in the ACK/NACK response message logic block unit into the preset locations of the virtual matrix in a descending order of row numbers progressively from the last row of the virtual matrix row by row.

When reading out the elements, reading out the elements in the virtual matrix from a first column of the virtual matrix column by column, wherein, for each column, the elements are read out from top to bottom (i.e., in an ascending order of row numbers) in turn to obtain a control/data information logic block unit, and for each element, it is read out by means of a bit sequence, to finally obtain a control/data information bit sequence [$h_0^1$, $h_1^1$, $h_2^1$, ..., $h_{H_1+Q_{RI}-1}^1$].

Method Two

Two virtual matrixes are generated according to a total number of ($H'_1+Q'_{RI}$), which are a first virtual matrix and a second virtual matrix respectively; assume that the current sub-frame uses a normal cyclic prefix structure, a column number of the virtual matrix is 12, and when data is written, odd elements in [$q_0^{RI}$, $q_1^{RI}$, $q_2^{RI}$, ..., $q_{Q'_{RI}-1}^{RI}$] are first written into preset locations of the first virtual matrix in a descending order of row numbers progressively from a last row of the first virtual matrix row by row, similarly, even elements in [$q_0^{RI}$, $q_1^{RI}$, $q_2^{RI}$, ..., $q_{Q'_{RI}-1}^{RI}$] are written into preset locations of the second virtual matrix in a descending order of row numbers progressively from a last row of the second virtual matrix row by row, then odd elements in a new data information logic unit [$\underline{g}_0^1$, $\underline{g}_1^1$, $\underline{g}_2^1$, ..., $\underline{g}_M^1$] are written into the first virtual matrix according to a rule row by row, and similarly, and similarly even elements in [$\underline{g}_0^1$, $\underline{g}_1^1$, $\underline{g}_2^1$, ..., $\underline{g}_M^1$] are written into the second virtual matrix row by row, wherein, locations where the rank indication information logic units are written are skipped; and finally, odd elements in ACK/NACK response message logic unit [$q_0^{ACK}$, $q_1^{ACK}$, $q_2^{ACK}$, ..., $q_{Q'_{ACK}-1}^{ACK}$] are written into preset locations of the first virtual matrix in a descending order of row numbers progressively from a last row of the first virtual matrix row by row, and even elements in ACK/NACK response message logic unit [$q_0^{ACK}$, $q_1^{ACK}$, $q_2^{ACK}$, ..., $q_{Q'_{ACK}-1}^{ACK}$] are written into preset locations of the second virtual matrix in a descending order of row numbers progressively from a last row of the second virtual matrix row by row.

when reading out the elements, for each virtual matrix, reading out the elements in the virtual matrix from a first column of the virtual matrix column by column, wherein, for each column, the elements are read out from top to bottom (i.e., in an ascending order of row numbers) in turn, in the read out elements, elements read out from the first virtual matrix constitute odd elements in the control/data information logic unit, and elements read out from the second virtual matrix constitute even elements in the control/data information logic unit, and for each element, it is read out by means of a bit sequence, to finally obtain a control/data information bit sequence [$h_0^1$, $h_1^1$, $h_2^1$, ..., $h_{H_1+Q_{RI}-1}^1$].

Method Three generating one virtual matrix according to a total number of ($H'_1+Q'_{RI}$), since when a current sub-frame uses a normal cyclic prefix structure, the column number of the virtual matrix is 12; and when writing the elements, first writing odd elements in the rank indication information logic unit [$q_0^{RI}$, $q_1^{RI}$, $q_2^{RI}$, ..., $q_{Q'_{RI}-1}^{RI}$] into preset locations of the virtual matrix every one row from a last but one row of the virtual matrix, and then writing odd elements in the new data information logic unit [$\underline{g}_0^1$, $\underline{g}_1^1$, $\underline{g}_2^1$, ..., $\underline{g}_M^1$] into the virtual matrix every one row from a first row of the virtual matrix, wherein, when writing the elements, locations where the rank indication information logic units are written are skipped; and finally, writing odd elements in the ACK/NACK response message logic unit [$q_0^{ACK}$, $q_1^{ACK}$, $q_2^{ACK}$, ..., $q_{Q'_{ACK}-1}^{ACK}$] into the preset locations of the virtual matrix every one row from a last but one row of the virtual matrix; and when writing the elements, first writing even elements in the rank indication information logic unit [$q_0^{RI}$, $q_1^{RI}$, $q_2^{RI}$, ..., $q_{Q'_{RI}-1}^{RI}$] into preset locations of the virtual matrix every one row from a last row of the virtual matrix, and then writing even elements in the new data information logic unit [$\underline{g}_0^1$, $\underline{g}_1^1$, $\underline{g}_2^1$, ..., $\underline{g}_M^1$] into the virtual matrix every one row from a second row of the virtual matrix, wherein, when writing the elements, locations where the rank indication information logic units are written are skipped; and finally, writing even elements in the ACK/NACK response message logic unit [$q_0^{ACK}$, $q_1^{ACK}$, $q_2^{ACK}$, ..., $q_{Q'_{ACK}-1}^{ACK}$] into the preset locations of the virtual matrix every one row from a last row of the virtual matrix.

When reading out the elements, reading out the elements in the virtual matrix in an ascending order of column numbers progressively from a first column of the virtual matrix column by column, wherein, for each column, the elements are read out from top to bottom (i.e., in an ascending order of row numbers) in turn, and for each element, it is read out by means of a bit sequence, to finally obtain a control/data information bit sequence [$h_0^1$, $h_1^1$, $h_2^1$, ..., $h_{H_1+Q_{RI}-1}^1$].

In step S610, after performing scrambling, modulating, layer mapping, transmission pre-encoding and pre-encoding on [$f_0^2$, $f_1^2$, $f_2^2$, ..., $f_{G_2-1}^2$] and [$h_0^1$, $h_1^1$, $h_2^1$, ..., $h_{H_1+Q_{RI}-1}^1$], and mapping them to physical resources, the physical resources are transmitted to a base station through corresponding antenna ports. The existing technologies can be referred to for specific operations of the step.

Embodiment Two

Figure 8:
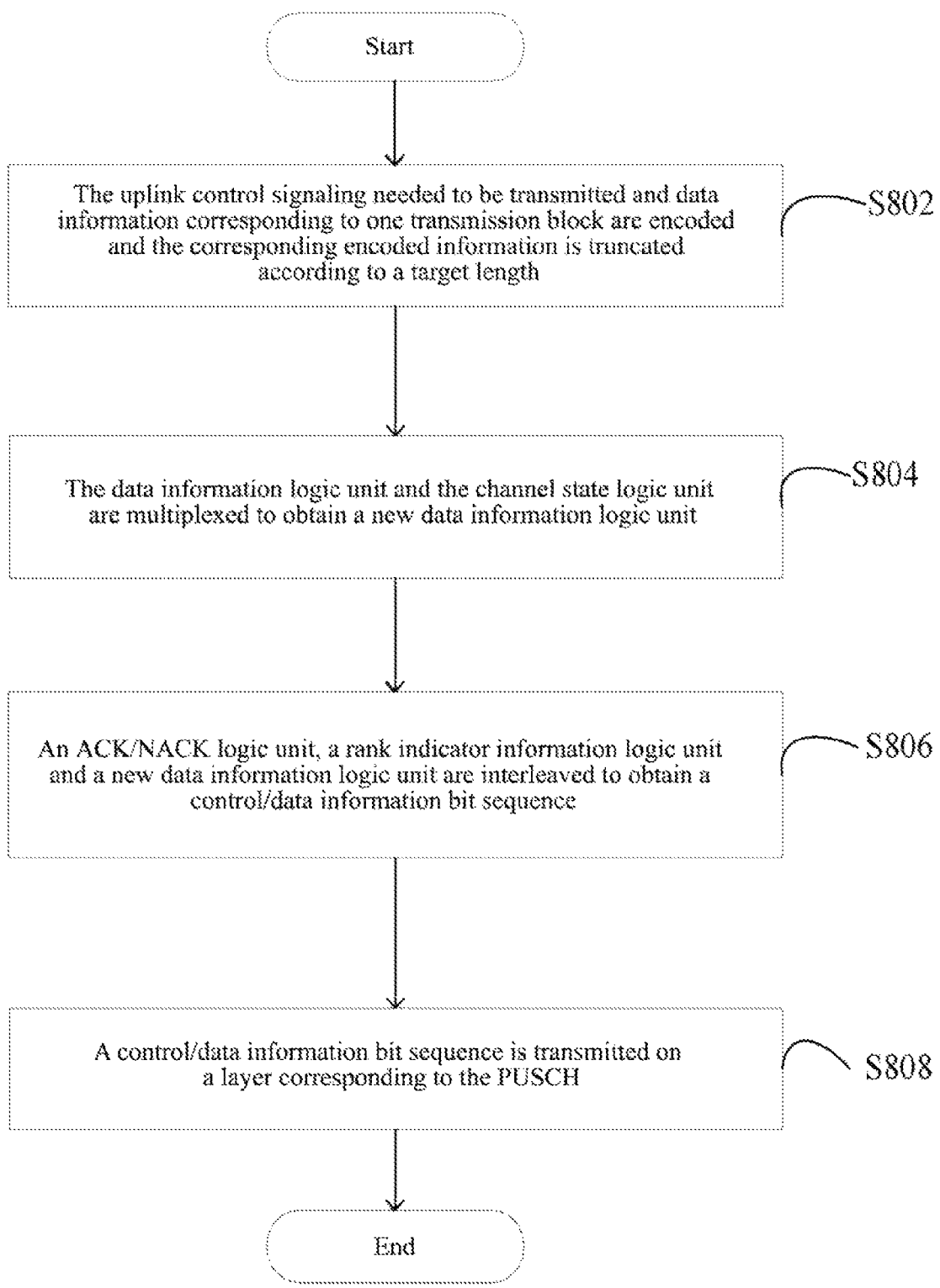
FIG. 8 is a flowchart according to embodiment two of the present invention.

The present embodiment corresponds to a condition where only one transmission block is configured and there is data on the data block. FIG. 8 is a flowchart of embodiment two of a method for transmitting uplink control signaling on a physical uplink shared channel according to an embodiment of the present invention. As shown in FIG. 8, the method for transmitting uplink control signaling on a physical uplink shared channel according to an embodiment of the present invention primarily comprises the following processes (step S802 to step S808):

In step S802, the uplink control signaling needed to be transmitted and data information corresponding to one transmission block are encoded and the corresponding encoded information is truncated according to a target length;

In step S804, the data logic unit and the channel state information logic unit on the transmission block are multiplexed to obtain a new data logic unit;

In step S806, an ACK/NACK response message logic unit, a rank indication information logic unit and a new data information logic unit are interleaved to obtain a control/data information bit sequence;

In step S808, after performing scrambling, modulating, layer mapping, transmission pre-encoding, and pre-encoding on the control/data information bit sequence, and mapping it to the physical resources, the physical resources are transmitted to a base station through corresponding antenna ports.

Various details of the above process will be further described by specific embodiments hereinafter.

Application Example One

Figure 9:
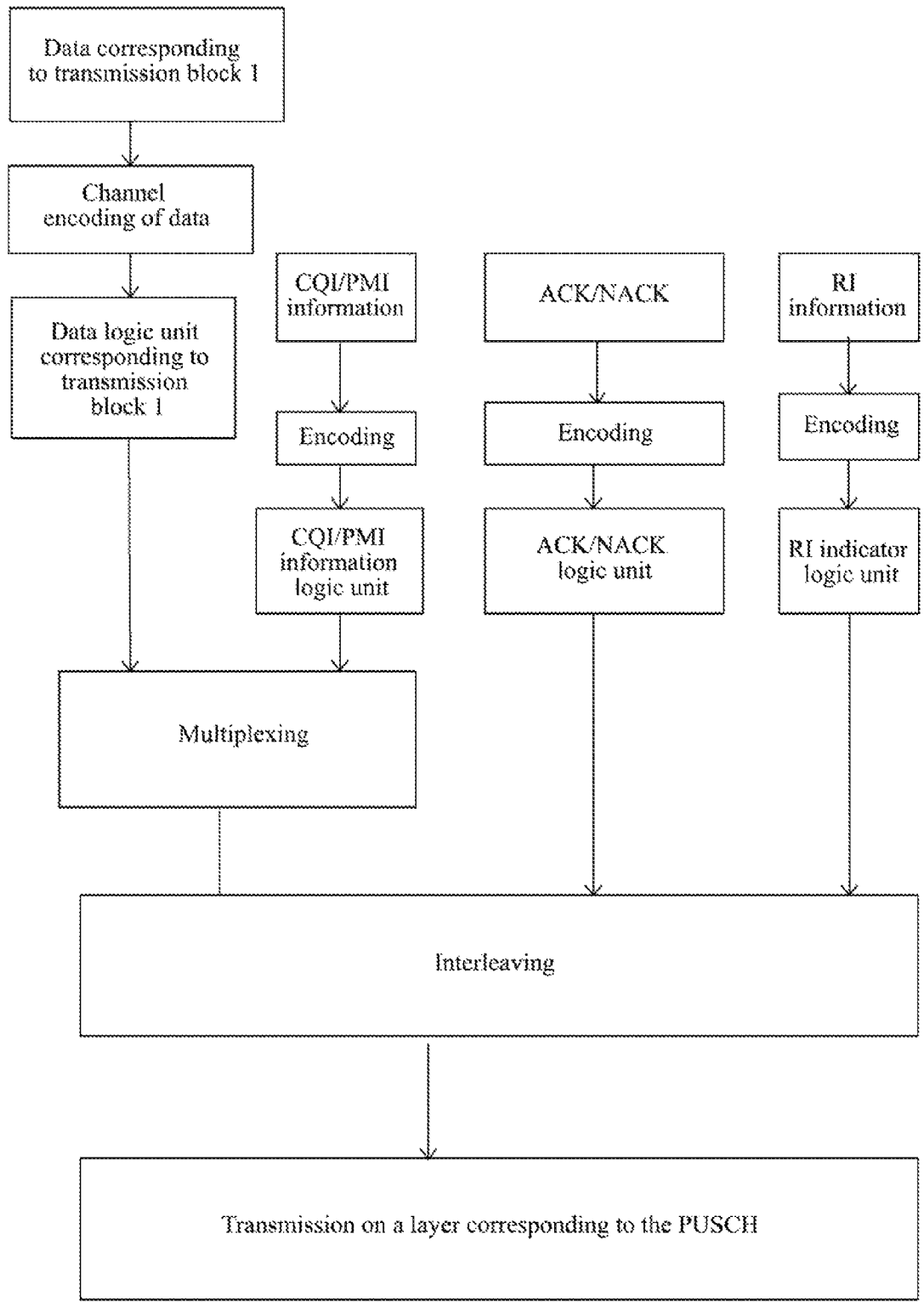
FIG. 9 is a diagram according to embodiment two of the present invention.

Assume that the PUSCH has one transmission block TB1 and TB1 corresponds to one transmission layer when being transmitted on the PUSCH, and the control signaling needed to be transmitted by the current sub-frame is $[O_0^{ACK}, O_1^{ACK}, \ldots O_3^{ACK}]$, $[O_0^{RI}, O_1^{RI}]$ and $[O_0^{CQI}, O_1^{CQI}, \ldots O_{10}^{CQI}]$ respectively, the current sub-frame is a normal cyclic prefix, there is no SRS to be transmitted, preset locations of the RI information have column numbers being 1, 10, 7 and 4, the preset locations of the ACK/NACK response message have column numbers being 2, 10, 8 and 3, and the elements in the logic unit are numbered from 1. The diagram of embodiment two is shown in FIG. 9, and the present invention will be described in detail in conjunction with a flowchart hereinafter:

In step S802, since there is only one transmission block, a target transmission block is the transmission block, different encoding modes are selected according to a modulation mode $Q_m$ indicated by $I_{MCS}$, the ACK/NACK response message, the RI information, the CQI/PMI information are encoded respectively, and the encoded bit sequences $[q_0^{ACK}, q_1^{ACK}, q_2^{ACK}, \ldots, q_{Q_{ACK}-1}^{ACK}]$, $[q_0^{RI}, q_1^{RI}, q_2^{RI}, \ldots, q_{Q_{RI}-1}^{RI}]$ and $[q_0^{CQI}, q_1^{CQI}, q_2^{CQI}, \ldots, q_{Q_{CQI}-1}^{CQI}]$ are obtained according to target lengths $Q_{ACK}$, $Q_{RI}$ and $Q_{CQI}$, then the ACK/NACK response message logic unit is $[\underline{q}_0^{ACK}, \underline{q}_1^{ACK}, \underline{q}_2^{ACK}, \ldots, \underline{q}_{Q'_{ACK}-1}^{ACK}]$, the RI message logic unit is $[\underline{q}_0^{RI}, \underline{q}_1^{RI}, \underline{q}_2^{RI}, \ldots, \underline{q}_{Q'_{RI}-1}^{RI}]$, the CQI/PMI information logic unit is $[\underline{q}_0^{CQI}, \underline{q}_1^{CQI}, \underline{q}_2^{CQI}, \ldots, \underline{q}_{Q_{CQI}-1}^{CQI}]$, data information corresponding to the transmission block is encoded, a target length of the corresponding data information is G, and the encoded bit sequence is obtained to be $[f_0, f_1, f_2, \ldots, f_{G-1}]$, then the data logic unit corresponding to the target transmission block is $[f_0, f_1, f_2, \ldots, f_{G-1}]$;

In step S804, the encoded data information logic units $[f_0, f_1, f_2, \ldots, f_{G-1}]$ and $[\underline{q}_0^{CQI}, \underline{q}_1^{CQI}, \underline{q}_2^{CQI}, \ldots, \underline{q}_{Q_{CQI}-1}^{CQI}]$ are multiplexed into a new data information logic unit in accordance with an order of first being written into the CQI/PMI information logic unit and then being written into the data information logic unit, to obtain $[\underline{g}_0, \underline{g}_1, \underline{g}_2, \ldots, \underline{g}_{H'-1}]$;

In step S806, one virtual matrix is generated according to $(H'_1+Q'_{RI})$; since the current sub-frame is a normal cyclic prefix, the column number of the virtual matrix is 12, and $[\underline{q}_0^{RI}, \underline{q}_1^{RI}, \underline{q}_2^{RI}, \ldots, \underline{q}_{Q'_{RI}-1}^{RI}]$ is written into preset locations of the virtual matrix in a descending order of row numbers progressively from a last row of the virtual matrix row by row, and then the new data information logic unit $[\underline{g}_0^1, \underline{g}_1^1, \underline{g}_2^1, \ldots, \underline{g}_{H'_1-1}^1]$ is written into the virtual matrix in an ascending order of row numbers progressively from a first row of the virtual matrix row by row; wherein, locations where the rank indication information logic units are written are skipped; and finally, $[\underline{q}_0^{ACK}, \underline{q}_1^{ACK}, \underline{q}_2^{ACK}, \ldots, \underline{q}_{Q'_{ACK}-1}^{ACK}]$ is written into preset locations of the virtual matrix in turn in a descending order of row numbers progressively from the last row of the virtual matrix row by row; and when being read out, the elements in the virtual matrix are read out from a first column of the virtual matrix column by column, wherein, for each column, the elements are read out from top to bottom (i.e., in an ascending order of row numbers) in turn, and for each element, it is read out by means of a bit sequence, to finally obtain a control/data information bit sequence $[h_0^1, h_1^1, h_2^1, \ldots, h_{H_1+Q_{RI}-1}^1]$.

In step S808, after performing scrambling, modulating, layer mapping, transmission pre-encoding, and pre-encoding on the control/data information bit sequence $[h_0^1, h_1^1, h_2^1, \ldots, h_{H+Q_{RI}-1}^1]$, and mapping it to the physical resources, the physical resources are transmitted to a base station through corresponding antenna ports.

Application Example Two

Assume that the PUSCH has one transmission block TB1 and TB1 corresponds to two transmission layers when being transmitted on the PUSCH, and the control signaling needed to be transmitted by the current sub-frame is $[O_0^{ACK}, O_1^{ACK}, \ldots O_3^{ACK}]$, $[O_0^{RI}, O_1^{RI}]$ and $[O_0^{CQI}, O_1^{CQI}, \ldots O_{10}^{CQI}]$ respectively, the current sub-frame is a normal cyclic prefix, there is no SRS to be transmitted, preset locations of the RI information have column numbers being 1, 10, 7 and 4, the preset locations of the ACK/NACK response message have column numbers being 2, 10, 8 and 3, and the elements in the logic unit are numbered from 1. The diagram of embodiment two is shown in FIG. 9, and the present invention will be described in detail in conjunction with a flowchart hereinafter:

In step S802, since there is only one transmission block, a target transmission block is the transmission block, different encoding modes are selected according to a modulation mode $Q_m$ indicated by $I_{MCS}$, the ACK/NACK response message, the RI information and the CQI/PMI information are encoded respectively, and the encoded bit sequences $[q_0^{ACK}, q_1^{ACK}, q_2^{ACK}, \ldots, q_{Q_{ACK}-1}^{ACK}]$, $[q_0^{RI}, q_1^{RI}, q_2^{RI}, \ldots, q_{Q_{RI}-1}^{RI}]$ and $[q_0^{CQI}, q_1^{CQI}, q_2^{CQI}, \ldots, q_{Q_{CQI}-1}^{CQI}]$ are obtained according to target lengths $Q_{ACK}$, $Q_{RI}$ and $Q_{CQI}$, then the ACK/NACK response message logic unit is $[\underline{q}_0^{ACK}, \underline{q}_1^{ACK}, \underline{q}_2^{ACK}, \ldots, \underline{q}_{Q'_{ACK}-1}^{ACK}]$, the RI message logic unit is $[\underline{q}_0^{RI}, \underline{q}_1^{RI}, \underline{q}_2^{RI}, \ldots, \underline{q}_{Q'_{RI}-1}^{RI}]$, the CQI/PMI information logic unit is $[\underline{q}_0^{CQI}, \underline{q}_1^{CQI}, \underline{q}_2^{CQI}, \ldots, \underline{q}_{Q_{CQI}-1}^{CQI}]$, data information corresponding to the transmission block is encoded, a target length of the corresponding data information is G, and the encoded bit sequence is obtained to be $[f_0, f_1, f_2, \ldots, f_{G-1}]$, and then the data information logic unit corresponding to the target transmission block is $[f_0, f_1, f_2, \ldots, f_{G-1}]$;

In step S804, the encoded data information logic units $[f_0, f_1, f_2, \ldots, f_{G-1}]$ and $[\underline{q}_0^{CQI}, \underline{q}_1^{CQI}, \underline{q}_2^{CQI}, \ldots, \underline{q}_{Q_{CQI}-1}^{CQI}]$ are multiplexed into a new data information logic unit in accordance with an order of first being written into the CQI/PMI information logic unit and then being written into the data information logic unit, to obtain $[\underline{g}_0, \underline{g}_1, \underline{g}_2, \ldots, \underline{g}_{H'-1}]$;

In step S806, the step comprises three methods:

Method one: odd elements in $[\underline{q}_0^{ACK}, \underline{q}_1^{ACK}, \underline{q}_2^{ACK}, \ldots, \underline{q}_{Q'_{ACK}-1}^{ACK}]$ constituting a first ACK/NACK response message logic sub-unit $[q_{10}^{ACK}, q_{11}^{ACK}, q_{12}^{ACK}, \ldots, q_{1m_{ACK}}^{ACK}]$, even elements in $[\underline{q}_0^{ACK}, \underline{q}_1^{ACK}, \underline{q}_2^{ACK}, \ldots, \underline{q}_{Q'_{ACK}-1}^{ACK}]$ constituting a second ACK/NACK response message logic sub-unit $[q_{20}^{ACK}, q_{21}^{ACK}, q_{22}^{ACK}, \ldots, q_{2n_{ACK}}^{ACK}]$, $(m_{ACK}+n_{ACK}=Q'_{ACK})$, constituting $[q_{10}^{ACK}, q_{11}^{ACK}, q_{12}^{ACK}, \ldots, q_{1m_{ACK}}^{ACK}]$ and $[q_{20}^{ACK}, q_{21}^{ACK}, q_{22}^{ACK}, \ldots, q_{2n_{ACK}}^{ACK}]$ into an ACK/NACK logic block unit $[\underline{q}_0^{ACK}, \underline{q}_1^{ACK}, \underline{q}_2^{ACK}, \ldots,$ $q_{M_{ACK}}{}^{ACK}$], and similarly, obtaining a rank indication information logic block unit [$q_0^{RI}, q_1^{RI}, q_2^{RI}, \ldots, q_{M_{RI}}{}^{RI}$] and a new data information logic block unit [$g_0^1, g_1^1, g_2^1, \ldots, g_M^1$]; and generating one virtual matrix according to a total number (M+$M_{RI}$); since the current sub-frame is a normal cyclic prefix, the column number of the virtual matrix is 12, when writing data, first writing [$q_0^{RI}, q_1^{RI}, q_2^{RI}, \ldots, q_{Q'_{RI}-1}{}^{RI}$] into preset locations of the virtual matrix in a descending order of row numbers progressively from a last row of the virtual matrix row by row, and then writing the new data information logic unit [$g_0, g_1, g_2, \ldots, g_M$] into the virtual matrix in an ascending order of row numbers progressively from a first row of the virtual matrix row by row; wherein, locations where the rank indication information logic block units are written are skipped; and finally, writing the elements [$q_0^{ACK}, q_1^{ACK}, q_2^{ACK}, \ldots, q_{M_{ACK}}{}^{ACK}$] in the ACK/NACK response message logic block unit into preset locations of the virtual matrix in a descending order of row numbers progressively from the last row of the virtual matrix row by row; and when reading out the elements, reading out the elements in the matrix from a first column of the virtual matrix column by column, wherein, for each column, the elements are read out from top to bottom (i.e., in an ascending order of row numbers) in turn to obtain a control/data information logic block unit, and for each element, it is read out by means of a bit sequence, to finally obtain a control/data information bit sequence [$h_0, h_1, h_2, \ldots, h_{H+Q_{RI}-1}$].

Method Two

Two virtual matrixes are generated according to a total number of (H'$_1$+Q'$_{RI}$), which are a first virtual matrix and a second virtual matrix respectively; assume that the current sub-frame uses a normal cyclic prefix structure, a column number of the virtual matrix is 12, and when data is written, odd elements in [$q_0^{RI}, q_1^{RI}, q_2^{RI}, \ldots, q_{Q'_{RI}-1}{}^{RI}$] are first written into preset locations of the first virtual matrix in a descending order of row numbers progressively from a last row of the first virtual matrix row by row, similarly, even elements in [$q_0^{RI}, q_1^{RI}, q_2^{RI}, \ldots, q_{Q'_{RI}-1}{}^{RI}$] are written into preset locations of the second virtual matrix in a descending order of row numbers progressively from a last row of the second virtual matrix row by row, then odd elements in a new data information logic unit [$g_0, g_1, g_2, \ldots, g_{H'-1}$] are written into the first virtual matrix according to a rule, and similarly, even elements in [$g_0, g_1, g_2, \ldots, g_{H'-1}$] are written into the second virtual matrix row by row, wherein, locations where the rank indication information logic units are written are skipped; and finally, odd elements in ACK/NACK response message logic unit [$q_0^{ACK}, q_1^{ACK}, q_2^{ACK}, \ldots, q_{Q'_{ACK}-1}{}^{ACK}$] are written into preset locations of the first virtual matrix in a descending order of row numbers progressively from a last row of the first virtual matrix row by row, and even elements in ACK/NACK response message logic unit [$q_0^{ACK}, q_1^{ACK}, q_2^{ACK}, \ldots, q_{Q'_{ACK}-1}{}^{ACK}$] are written into preset locations of the second virtual matrix in a descending order of row numbers progressively from a last row of the second virtual matrix row by row.

when reading out the elements, for each virtual matrix, reading out the elements in the virtual matrix from a first column of the virtual matrix column by column, wherein, for each column, the elements are read out from top to bottom (i.e., in an ascending order of row numbers) in turn, in the read out elements, elements read out from the first virtual matrix constitute odd elements in the control/data information logic unit, and elements read out from the second virtual matrix constitute even elements in the control/data information logic unit, and for each element, it is read out by means of a bit sequence, to finally obtain a control/data information bit sequence [$h_0, h_1, h_2, \ldots, h_{H+Q_{RI}-1}$].

Method Three generating one virtual matrix according to a total number of (H'$_1$+Q'$_{RI}$), since when a current sub-frame uses a normal cyclic prefix structure, the column number of the virtual matrix is 12; first writing odd elements in the rank indication information logic unit [$q_0^{RI}, q_1^{RI}, q_2^{RI}, \ldots, q_{Q'_{RI}-1}{}^{RI}$] into preset locations of the virtual matrix every one row from a last but one row of the virtual matrix, and then writing odd elements in the new data information logic unit [$g_0, g_1, g_2, \ldots, g_{H'-1}$] into the virtual matrix every one row from a first row of the virtual matrix, wherein, when writing data, locations where the rank indication information logic units are written are skipped; and finally, writing odd elements in the ACK/NACK response message logic unit [$q_0^{ACK}, q_1^{ACK}, q_2^{ACK}, \ldots, q_{Q'_{ACK}-1}{}^{ACK}$] into the preset locations of the virtual matrix every one row from a last but one row of the virtual matrix; and first writing even elements in the rank indication information logic unit [$q_0^{RI}, q_1^{RI}, q_2^{RI}, \ldots, q_{Q'_{RI}-1}{}^{RI}$] into preset locations of the virtual matrix every one row from the last row of the virtual matrix, and then writing even elements in the new data information logic unit [$g_0, g_1, g_2, \ldots g_{H'-1}$] into the virtual matrix every one row from a second row of the virtual matrix, wherein, when writing the data, locations where the rank indication information logic units are written are skipped; and finally, writing even elements in the ACK/NACK response message logic unit [$q_0^{ACK}, q_1^{ACK}, q_2^{ACK}, \ldots, q_{Q'_{ACK}-1}{}^{ACK}$] into the preset locations of the virtual matrix every one row from the last row of the virtual matrix; and when reading out the elements, reading out the elements in the matrix in an ascending of column numbers progressively from a first column of the virtual matrix column by column, wherein, for each column, the elements are read out from top to bottom (i.e., in an ascending order of row numbers) in turn, and for each element, it is read out by means of a bit sequence, to finally obtain a control/data information bit sequence [$h_0, h_1, h_2, \ldots, h_{H+Q_{RI}-1}$]

In step S808, after performing scrambling, modulating, layer mapping, transmission pre-encoding, and pre-encoding on [$h_0, h_1, h_2, \ldots, h_{H+Q_{RI}-1}$], and mapping it to the physical resources, the physical resources are transmitted to a base station through corresponding antenna ports.

Embodiment Three

Figure 10:
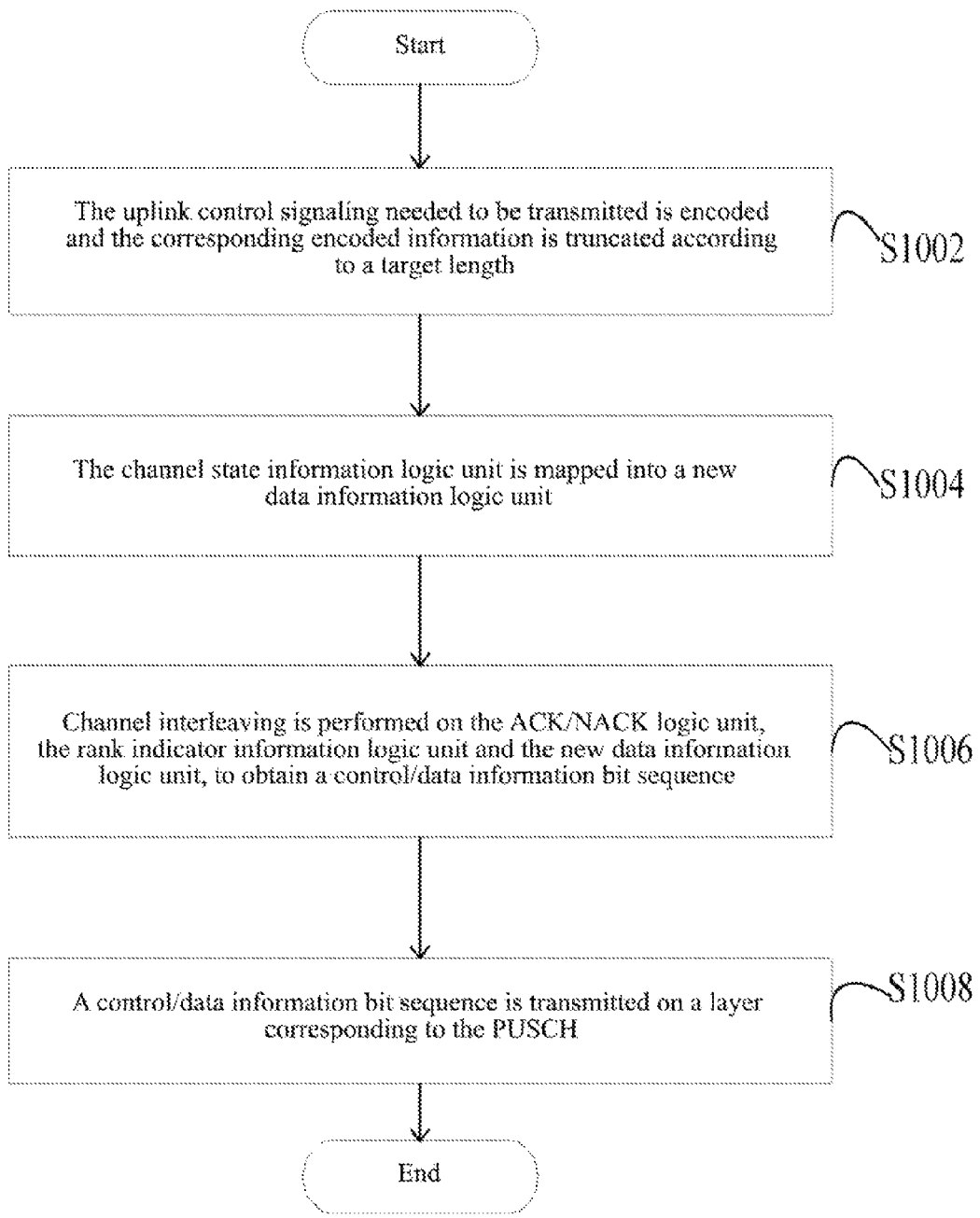
FIG. 10 is a flowchart according to embodiment three of the present invention.

The present invention corresponds to a condition where only one transmission block is configured and there is no data on the transmission block. FIG. 10 is a flowchart of embodiment three of a method for transmitting uplink control signaling on a physical uplink shared channel according to an embodiment of the present invention. As shown in FIG. 10, the method for transmitting uplink control signaling on a physical uplink shared channel according to an embodiment of the present invention primarily comprises the following processes (step S1002 to step S1008):

In step S1002, the uplink control signaling needed to be transmitted is encoded and the corresponding encoded information is truncated according to a target length.

In step S1004, the channel state information logic unit is mapped into a new data information logic unit;

In step S1006, channel data interleaving is performed on the new data information logic unit, the ACK/NACK response message logic unit and the rank indication information logic unit, to obtain a control/data information bit sequence.

In step S1008, after performing scrambling, modulating, layer mapping, transmission pre-encoding and pre-encoding on the control/data information bit sequence, and mapping it to physical resources, the physical resources are transmitted to a base station through corresponding antenna ports.

Various details of the above processes will be described in detail further by specific embodiments hereinafter.

Application Example One

Figure 11:
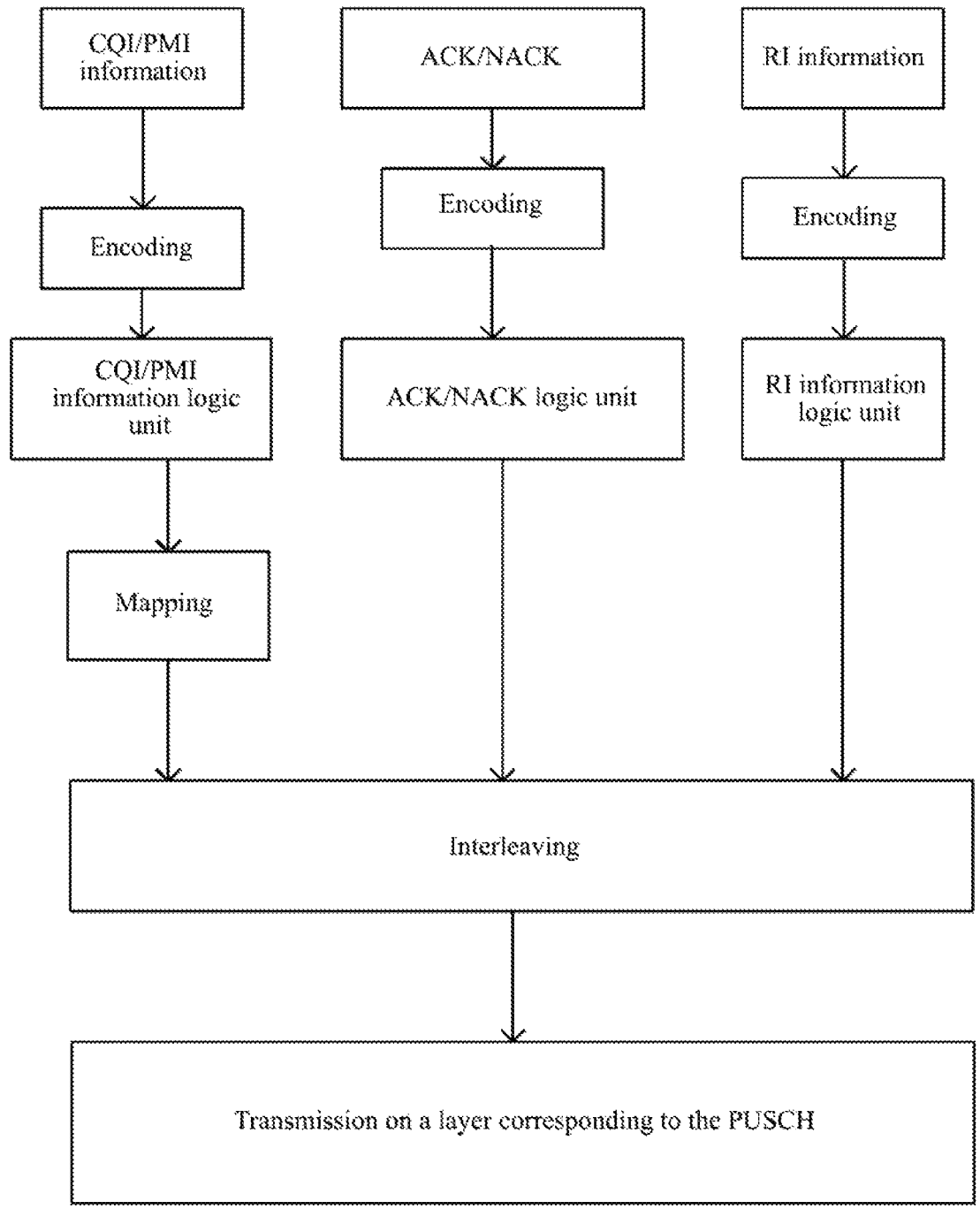
FIG. 11 is a diagram according to embodiment three of the present invention.

Assume that only one transmission block TB1 is configured and there is no data information on the transmission block, TB1 corresponds to one transmission layer when being transmitted on the PUSCH, and the control signaling needed to be transmitted by the current sub-frame is $[O_0^{ACK}, O_1^{ACK}, \ldots O_3^{ACK}]$, $[O_0^{RI}, O_1^{RI}]$ and $[O_0^{CQI}, O_1^{CQI}, \ldots O_{10}^{CQI}]$ respectively, the current sub-frame is a normal cyclic prefix, there is no SRS needed to be transmitted, preset locations of the RI information have column numbers being 1, 10, 7 and 4, the preset locations of the ACK/NACK response message have column numbers being 2, 10, 8 and 3. The diagram of embodiment three is shown in FIG. 11, and the present invention will be described in detail in conjunction with a flowchart hereinafter:

In step S1002, since there is only one transmission block, a target transmission block is the transmission block, different encoding modes are selected according to a modulation mode $Q_m$ indicated by $I_{MCS}$, the ACK/NACK response message, the RI information, the CQI/PMI information are encoded respectively, and the encoded bit sequences $[q_0^{ACK}, q_1^{ACK}, q_2^{ACK}, \ldots, q_{Q_{ACK}-1}^{ACK}]$, $[q_0^{RI}, q_1^{RI}, q_2^{RI}, \ldots, q_{Q_{RI}-1}^{RI}]$ and $[q_0^{CQI}, q_1^{CQI}, q_2^{CQI}, \ldots, q_{Q_{CQI}-1}^{CQI}]$ are obtained according to target lengths $Q_{ACK}$, $Q_{RI}$ and $Q_{CQI}$, then the ACK/NACK response message logic unit is $[\underline{q}_0^{ACK}, \underline{q}_1^{ACK}, \underline{q}_2^{ACK}, \ldots, \underline{q}_{Q'_{ACK}-1}^{ACK}]$, the RI message logic unit is $[\underline{q}_0^{RI}, \underline{q}_1^{RI}, \underline{q}_2^{RI}, \ldots, \underline{q}_{Q'_{RI}-1}^{RI}]$, the CQI/PMI information logic unit is $[\underline{q}_0^{CQI}, \underline{q}_1^{CQI}, \underline{q}_2^{CQI}, \ldots, \underline{q}_{Q_{CQI}-1}^{CQI}]$;

In step 1004, $[\underline{q}_0^{CQI}, \underline{q}_1^{CQI}, \underline{q}_2^{CQI}, \ldots, \underline{q}_{Q_{CQI}-1}^{CQI}]$ is mapped into a new data information logic unit, to obtain $[\underline{g}_0, \underline{g}_1, \underline{g}_2, \ldots, \underline{g}_{H'-1}]$;

In step 1006, one virtual matrix is generated according to a total number of $(H'_1 + Q'_{RI})$; since the current sub-frame is a normal cyclic prefix, the column number of the virtual matrix is 12, and $[\underline{q}_0^{RI}, \underline{q}_1^{RI}, \underline{q}_2^{RI}, \ldots, \underline{q}_{Q'_{RI}-1}^{RI}]$ is written into preset locations of the virtual matrix in a descending order of row numbers progressively from a last row of the virtual matrix row by row, and then the new data information logic unit $[\underline{g}_0, \underline{g}_1, \underline{g}_2, \ldots, \underline{g}_{H'-1}]$ is written into the virtual matrix in an ascending order of row numbers progressively from a first row of the virtual matrix row by row; wherein, locations where the rank indication information logic units are written are skipped; and finally, $[\underline{q}_0^{ACK}, \underline{q}_1^{ACK}, \underline{q}_2^{ACK}, \ldots, \underline{q}_{Q'_{ACK}-1}^{ACK}]$ is written into preset locations of the virtual matrix in turn in a descending order of row numbers progressively from the last row of the virtual matrix row by row.

when being read out, the elements in the virtual matrix are read out from a first column of the virtual matrix column by column, wherein, for each column, the elements are read out from top to bottom (i.e., in an ascending order of row numbers) in turn, and for each element, it is read out by means of a bit sequence, to finally obtain a control/data information bit sequence $[h_0, h_1, h_2, \ldots, h_{H+Q_{RI}-1}]$.

In step 1008, after performing scrambling, modulating, layer mapping, transmission pre-encoding, and pre-encoding on $[h_0, h_1, h_2, \ldots, h_{H+Q_{RI}-1}]$, and mapping it to the physical resources, the physical resources are transmitted to a base station through corresponding antenna ports.

Embodiment Four

Figure 12:
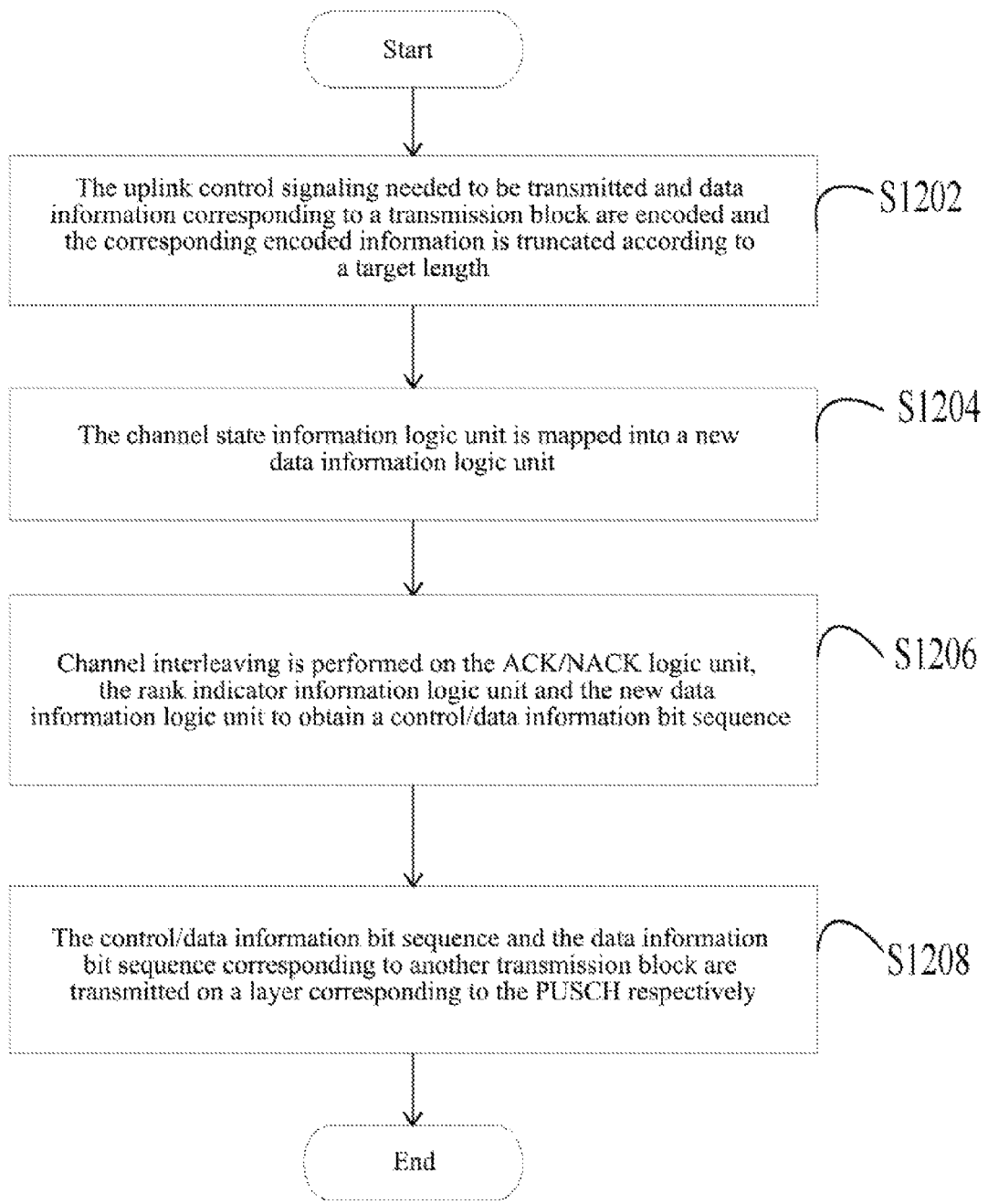
FIG. 12 is a flowchart according to embodiment four of the present invention.

The present invention corresponds to a condition where two transmission blocks are configured and there is no data on one transmission block therein. FIG. 12 is a flowchart of embodiment four of a method for transmitting uplink control signaling on a physical uplink shared channel according to an embodiment of the present invention. As shown in FIG. 12, the method for transmitting uplink control signaling on a physical uplink shared channel according to an embodiment of the present invention primarily comprises the following processes (step S1202 to step S1208):

In step S1202, the uplink control signaling needed to be transmitted and data information corresponding to a transmission block are encoded and the corresponding encoded information is truncated according to a target length.

In step S1204, the channel state information logic unit is mapped into a new data information logic unit;

In step S1206, channel interleaving is performed on the ACK/NACK response message logic unit, the rank indication information logic unit and the new data information logic unit to obtain a control/data information bit sequence.

In step S1208, after performing scrambling, modulating, layer mapping, transmission pre-encoding and pre-encoding on the control/data bit sequence with a data information bit sequence corresponding to another transmission block, and mapping them to physical resources, the physical resources are transmitted to a base station through corresponding antenna ports.

Various details of the above processes will be described in detail further by specific embodiments hereinafter.

Figure 13:
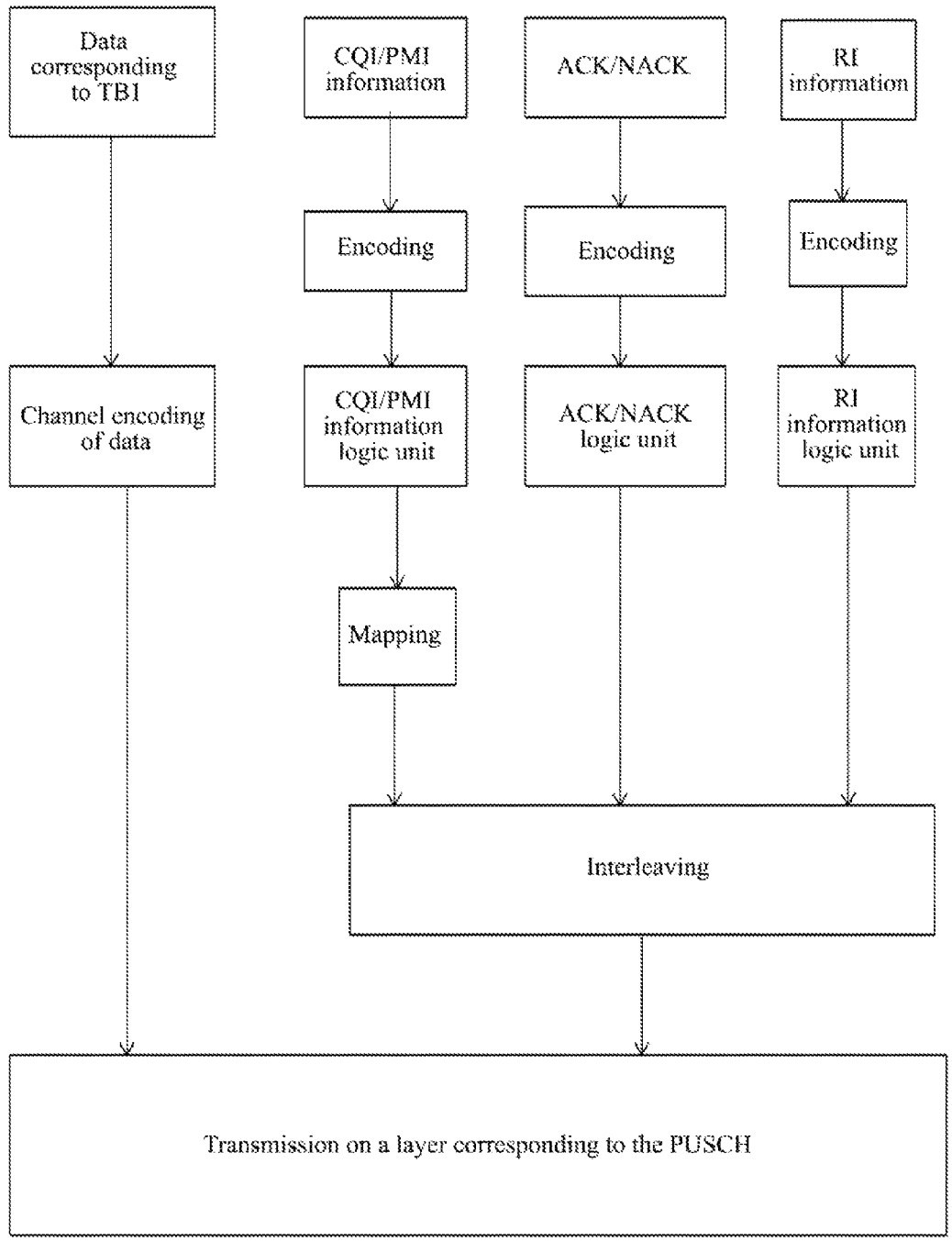
FIG. 13 is a diagram according to embodiment four of the present invention.

Assume that two transmission block TB1 and TB2 are configured and there is no data information on TB2 and TB2 corresponds to one transmission layer when being transmitted on the PUSCH, and the control signaling needed to be transmitted by the current sub-frame is $[O_0^{ACK}, O_1^{ACK}, \ldots O_3^{ACK}]$, $[O_0^{RI}, O_1^{RI}]$ and $[O_0^{CQI}, O_1^{CQI}, \ldots O_{10}^{CQI}]$, the current sub-frame is a normal cyclic prefix, there is no SRS needed to be transmitted, preset locations of the RI information have column numbers being 1, 10, 7 and 4, the preset locations of the ACK/NACK response message have column numbers being 2, 10, 8 and 3. The diagram of embodiment four is shown in FIG. 13, and the present invention will be described in detail in conjunction with a flowchart hereinafter:

In step 1202, since only TB2 does not have corresponding data information, a target transmission block is TB2, different encoding modes are selected according to a modulation mode $Q_m^2$ indicated by the target transmission block $I_{MCS}^2$, the ACK/NACK response message, the RI information, the CQI/PMI information are encoded respectively, and the encoded bit sequences $[q_0^{ACK}, q_1^{ACK}, q_2^{ACK}, \ldots, q_{Q_{ACK}-1}^{ACK}]$, $[q_0^{RI}, q_1^{RI}, q_2^{RI}, \ldots, q_{Q_{RI}-1}^{RI}]$ and $[q_0^{CQI}, q_1^{CQI}, q_2^{CQI}, \ldots, q_{Q_{CQI}-1}^{CQI}]$ are obtained according to target lengths $Q_{ACK}$, $Q_{RI}$ and $Q_{CQI}$, then the ACK/NACK response message logic unit is $[\underline{q}_0^{ACK}, \underline{q}_1^{ACK}, \underline{q}_2^{ACK}, \ldots, \underline{q}_{Q'_{ACK}-1}^{ACK}]$, the RI message logic unit is $[\underline{q}_0^{RI}, \underline{q}_1^{RI}, \underline{q}_2^{RI}, \ldots, \underline{q}_{Q'_{RI}-1}^{RI}]$, the CQI/PMI information logic unit is $[\underline{q}_0^{CQI}, \underline{q}_1^{CQI}, \underline{q}_2^{CQI}, \ldots, \underline{q}_{Q_{CQI}-1}^{CQI}]$, the data information corresponding to TB1 is encoded to obtain the encoded bit sequence $[f_0^1, f_1^1, f_2^1, \ldots, f_{G_1-1}^1]$;

In step 1204, $[\underline{q}_0^{CQI}, \underline{q}_1^{CQI}, \underline{q}_2^{CQI}, \ldots, \underline{q}_{Q_{CQI}-1}^{CQI}]$ is mapped into a new data information logic unit, to obtain $[\underline{g}_0^2, \underline{g}_1^2, \underline{g}_2^2, \ldots, \underline{g}_{H'_2-1}^2]$;

In step 1206, one virtual matrix is generated according to a total number of $(H'_2+Q'_{RI})$; since the current sub-frame is a normal cyclic prefix, the column number of the virtual matrix is 12, and $[q_0^{RI}, q_1^{RI}, q_2^{RI}, \ldots, q_{Q'_{RI}-1}^{RI}]$ is written into preset locations of the virtual matrix in a descending order of row numbers progressively from a last row of the virtual matrix row by row, and then the new data information logic unit $[\underline{g}_0^2, \underline{g}_1^2, \underline{g}_2^2, \ldots, \underline{g}_{H'_2-1}^2]$ is written into the virtual matrix in an ascending order of row numbers progressively from a first row of the virtual matrix row by row; wherein, locations where the rank indication information logic units are written are skipped; and finally, $[\underline{q}_0^{ACK}, \underline{q}_1^{ACK}, \underline{q}_2^{ACK}, \ldots, \underline{q}_{Q'_{ACK}-1}^{ACK}]$ is written into preset locations of the virtual matrix in turn in a descending order of row numbers progressively from the last row of the virtual matrix row by row.

when being read out, the elements in the virtual matrix are read out from a first column of the virtual matrix column by column, wherein, for each column, the elements are read out from top to bottom (i.e., in an ascending order of row numbers) in turn, and for each element, it is read out by means of a bit sequence, to finally obtain a control/data information bit sequence $[h_0^2, h_1^2, h_2^2, \ldots, h_{H_2+Q_{RI}-1}^2]$.

In step 1208, after performing scrambling, modulating, layer mapping, transmission pre-encoding, and pre-encoding on $[h_0^2, h_1^2, h_2^2, \ldots, h_{H_2+Q_{RI}-1}^2]$ and $[f_0^1, f_1^1, f_2^1, \ldots, f_{G_1-1}^1]$, and mapping it to the physical resources, the physical resources are transmitted to a base station through corresponding antenna ports.

A person having ordinary skill in the art can understand that all or a part of steps in the above method can be implemented by programs instructing related hardware, and the programs can be stored in a computer readable storage medium, such as a read-only memory, disk or CD-ROM etc. Alternatively, all or a part of steps in the above embodiments can also be implemented by one or more integrated circuits. Accordingly, each module/unit in the above embodiments can be implemented in a form of hardware, or can also be implemented in a form of software functional module. The present invention is not limited to any particular form of a combination of hardware and software.

The above description is only the preferred embodiments of the present invention and is not intended to limit the present invention. The invention can have a variety of changes and variations for those skilled in the art. Any modification, equivalent substitution, improvement etc. which are made within the spirit and principle of the present invention should be included in the protection scope of the present invention.

INDUSTRIAL APPLICABILITY

The present invention provides a system and method for transmitting uplink control signaling on a physical uplink shared channel, which can enable transmitting uplink control signaling on the PUSCH while the PUSCH uses spatial division multiplexing in a LTE-A system.

What is claimed is:

1. A method for transmitting uplink control signaling on a physical uplink shared channel, comprising:
respectively encoding the uplink control signaling needed to be transmitted and data information corresponding to a transmission block and truncating the corresponding encoded information according to a target length; and
when one transmission block corresponds to a plurality of layers, interleaving information on various layers to be transmitted on the transmission block, and transmitting the interleaved information on a layer corresponding to the Physical Uplink Shared Channel (PUSCH);
wherein the information on the various layers includes uplink control signaling information, or the information on the various layers includes the data information and the uplink control signaling information;
selecting a target transmission block transmitting the uplink control signaling; wherein,
the uplink control signaling needed to be transmitted comprises any one or more of the following information: an Acknowledgement or Negative Acknowledgement response message, as well as rank indication information and channel state information;
after the step of truncating the corresponding encoded information according to a target length, the method further comprises:
generating an Acknowledgement or Negative Acknowledgement response message logic unit, a rank indication information logic unit and a channel state information logic unit in a form of modulation symbols from the encoded uplink control signaling and the data information corresponding to the target transmission block; and
performing the following operations before the interleaving:
if there is data transmission on the target transmission block, multiplexing the data information logic unit corresponding to the target transmission block and the channel state information logic unit, to obtain a new data information logic unit; and
if there is no data transmission on the target transmission block, mapping the channel state information logic unit, to obtain a new data information logic unit.

2. The method according to claim 1, wherein,
the step of interleaving the information on the various layers to be transmitted on the transmission block comprises: performing channel interleaving on the Acknowledgement or Negative Acknowledgement response message logic unit, the rank indication information logic unit and the new data information logic unit which are on the transmission block, to obtain a control and/or data information bit sequence.

3. The method according to claim 1, wherein,
the step of multiplexing the data information logic unit corresponding to the target transmission block and the channel state information logic unit comprises:
first placing the channel state logic unit on the new data information logic unit, and then placing the data information logic unit corresponding to the target transmission block on the new data information logic unit, wherein, a length of the obtained new data information logic unit is a sum of lengths of the channel state information logic unit and the data information logic unit; and
in the step of mapping the channel state information logic unit to obtain a new data information logic unit, the new data information logic unit is a channel state information logic unit.

4. The method according to claim 2, wherein,
the step of performing channel interleaving on the Acknowledgement or Negative Acknowledgement response message logic unit, the rank indication information logic unit and the new data information logic unit, to obtain a control and/or data information bit sequence comprises:
when the target transmission block is transmitted on the PUSCH and a number of corresponding transmission layers is 2, generating an Acknowledgement or Negative Acknowledgement response message logical block unit, a rank indication information logic block unit and a new data information logic block unit according to the Acknowledgement or Negative Acknowledgement response message logic unit, the rank indication information logic unit and the new data information logic block unit;

then generating one virtual matrix according to a total number of the rank indication information logic block unit and the new data information logic block unit; and when writing data into the virtual matrix, first writing elements in the rank indication information logic block unit into preset locations of the virtual matrix in a descending order of row numbers progressively from a last row of the virtual matrix row by row, and then writing elements in the new data information logic block unit into the virtual matrix in an ascending order of row numbers progressively from a first row of the virtual matrix row by row, wherein, locations where the rank indication information logic block units have been written are skipped;

and finally, writing elements in the Acknowledgement or Negative Acknowledgement response message logic block unit into preset locations of the virtual matrix in a descending order of row numbers progressively from the last row of the virtual matrix row by row; and when reading out data in the virtual matrix, reading out the elements in the virtual matrix from a first column of the matrix column by column, wherein, for each column, the elements are read out in an ascending order of row numbers in turn progressively, and for each element, it is read out in by means of a bit sequence, to finally obtain a control and/or data information bit sequence.

5. The method according to claim 4, wherein, the step of generating an Acknowledgement or Negative Acknowledgement response message logic block unit, a rank indication information logic block unit and a new data information logic block unit comprises:

first location elements in the Acknowledgement or Negative Acknowledgement response message logic unit constituting a first Acknowledge/Negative Acknowledgement response message logic sub-unit, second location elements in the Acknowledgement or Negative Acknowledgement response message logic unit constituting a second Acknowledge/Negative Acknowledgement response message logic sub-unit, similarly, first location elements in the rank indication information logic unit constituting a first rank indication information logic sub-unit, second location elements in the rank indication information logic unit constituting a second rank indication information logic sub-unit, and first location elements in the new data information logic unit constituting a first new data information logic sub-unit, second location elements in the new data information logic unit constituting a second new data information logic sub-unit, and the various logic sub-units constituting the various logic block units; and setting the first logic sub-unit as $[\underline{q}_{10}, \underline{q}_{11}, \underline{q}_{12}, \ldots, \underline{q}_{1m}]$ and the second logic sub-unit as $[\underline{q}_{20}, \underline{q}_{21}, \underline{q}_{22}, \ldots, \underline{q}_{2m}]$, the generated logic block unit being $[\underline{q}_0, \underline{q}_1, \underline{q}_2, \ldots, \underline{q}_m]$ wherein, $\underline{q}_i$ is a matrix comprised of $\underline{q}_{1i}$ and $\underline{q}_{2i}$.

6. The method according to claim 4, wherein, a number of the elements of the rank indication information logic block unit is set as $M_{RI}$, a number of the elements of the new data information logic block unit is set as M, a product of a row number and a column number of the generated virtual matrix is $(M+M_{RI})$;

when the sub-frame uses a normal cyclic prefix structure, the column number of the virtual matrix is 12; when the sub-frame uses an extended cyclic prefix structure, the column number of the virtual matrix is 10; and if there is a Sounding Reference Signal (SRS) needed to be transmitted, when the sub-frame uses the normal cyclic prefix structure, the column number of the virtual matrix is 11; and when the sub-frame uses the extended cyclic prefix structure, the column number of the virtual matrix is 9.

7. The method according to claim 5, wherein, the first location elements refer to a first half of the elements in the logic unit, and the second location elements refer to a second half of the elements in the logic unit; or the first location elements refer to a second half of the elements in the logic unit, and the second location elements refer to a first half of the elements in the logic unit; or when element numbers in the logic unit are started from 0, the first location elements refer to even elements in the logic unit, and the second location elements refer to odd elements in the logic unit; or when the element numbers in the logic unit are started from 1, the first location elements refer to odd elements in the logic unit, and the second location elements refer to even elements in the logic unit.

8. The method according to claim 1, wherein, if two transmission blocks are configured and there are corresponding data information on both transmission blocks, a mode of selecting the target transmission block is any one of the following modes:

fixing the target transmission block to a first transmission block or a second transmission block;

selecting the target transmission block according to a signaling indication;

selecting a transmission block with a larger modulation encoding index as the target transmission block; and selecting a transmission block with a larger transmission block size and a larger ratio of the resources which are occupied by the transmission block as the target transmission block;

if two transmission blocks are configured and there is corresponding data information on only one transmission block, the target transmission block is a transmission block with no corresponding data information; and if one transmission block is configured, the target transmission block is the transmission block.

9. A system for transmitting uplink control signaling on a physical uplink shared channel comprising an encoding module, an interleaving module and a transmitting module, wherein, the encoding module is configured to encode the uplink control signaling needed to be transmitted and data information corresponding to a transmission block and truncate the corresponding encoded information; and the interleaving module is configured to when one transmission block corresponds to a plurality of layers, interleave the information on various layers to be transmitted on the transmission block, and the transmitting module is configured to transmit the interleaved information on a layer corresponding to the Physical Uplink Shared Channel (PUSCH);

wherein the information on various layers includes uplink control signaling information, or the information on various layers includes the data information and the uplink control signaling information; wherein, the uplink control signaling needed to be transmitted comprises any one or more of the following information: an Acknowledgement or Negative Acknowledgement response message, and rank indication information and channel state information;

the encoding module is further configured to generate an Acknowledgement or Negative Acknowledgement response message logic unit, a rank indication information logic unit and a channel state information logic unit in a form of modulation symbols from the encoded uplink control signaling and data information corresponding to the transmission block;

the system further comprises a multiplexing module and/or a mapping module; wherein, the multiplexing module is configured to obtain a new data information logic unit according to the channel state information logic unit; and the mapping module is configured to obtains a new data information logic unit according to the channel state information logic unit.

10. The system according to claim 9, wherein, the system further comprises a selecting module, configured to select a target transmission block for transmitting the uplink control signaling;

the multiplexing module is configured to obtain the new data information logic unit according to the channel state information logic unit by the following mode: when there is data transmission on the target transmission block, multiplexing the data information logic unit and the channel state information logic unit corresponding to the target transmission block, to obtain a new data information logic unit; and the mapping module is configured to obtain the new data information logic unit according to the channel state information logic unit by the following mode: when there is no data transmission on the target transmission block, mapping the channel state information logic unit corresponding to the target transmission block, to obtain a new data information logic unit.

11. The system according to claim 9, wherein, the interleaving module is configured to interleave the information on various layers to be transmitted on the transmission block by the following mode: performing channel interleaving on the Acknowledgement or Negative Acknowledgement response message logic unit, the rank indication information logic unit and the new data information logic unit which are on the transmission block, to obtain an interleaved control and/or data information bit sequence.

12. The system according to claim 11, wherein, the system further comprises a selecting module, configured to select a target transmission block for transmitting the uplink control signaling;

the transmitting module is configured to transmit the interleaved data information on a layer corresponding to the PUSCH:

if only one transmission block has data transmission, the transmitting module transmitting the control and/or data information bit sequence on the target transmission block on the layer corresponding to the PUSCH; and if two transmission blocks are configured at present, the transmitting module transmitting the control and/or data information bit sequence on the target transmission block and data information bit sequence corresponding to another transmission block on the layer corresponding to the PUSCH.

13. The system according to claim 11, wherein, the interleaving module comprises a matrix generating unit, a data writing unit and a data readout unit; wherein, the matrix generating unit is configured to when a number of corresponding transmission layers M=2 while the transmission block is transmitted on the PUSCH, generate an Acknowledgement or Negative Acknowledgement response message logic block unit, a rank indication information logic block unit and a new data information logic block unit according to the Acknowledgement or Negative Acknowledgement response message logic unit, the rank indication information logic unit and the new data information logic unit; and generate one virtual matrix according to the rank indication information logic block unit and the new data information logic block unit;

the data writing unit is configured to first write elements in the rank indication information logic block unit into preset locations of the virtual matrix in a descending order of row numbers progressively from a last row of the virtual matrix row by row, and then write elements in the new data information logic block unit into the virtual matrix in an ascending order of row numbers progressively from a first row of the virtual matrix row by row, wherein, locations where the rank indication information logic block units are written are skipped; and finally, write the elements in the Acknowledgement or Negative Acknowledgement response message logic block unit into the preset locations of the virtual matrix in a descending order of row numbers progressively from the last row of the virtual matrix progressively row by row; and the data readout unit is configured to read out the elements in the matrix progressively from a first column of the virtual matrix column by column, wherein, for each column, the elements are read out in an ascending order of row numbers in turn progressively, and for each element, it is read out by means of a bit sequence, to finally obtain a control and/or data information bit sequence.

14. The system according to claim 10, wherein, the selecting module is configured to select the target transmission block for transmitting the uplink control signaling by the following mode:

if two transmission blocks are configured and there are corresponding data information on both transmission blocks, a mode of selecting the target transmission block is any one of the following modes:

fixing the target transmission block to a first transmission block or a second transmission block;

selecting the target transmission block according to a signaling indication;

selecting a transmission block with a larger modulation encoding index as the target transmission block; and selecting a transmission block with a larger transmission block size and a larger ratio of the resources which are occupied by the transmission block as the target transmission block;

if two transmission blocks are configured and there is corresponding data information on only one transmission block, the target transmission block is a transmission block with no corresponding data information; and if one transmission block is configured, the target transmission block is the transmission block.

15. The system according to claim 12, wherein, the selecting module is configured to select the target transmission block for transmitting the uplink control signaling by the following mode:

if two transmission blocks are configured and there are corresponding data information on both transmission blocks, a mode of selecting the target transmission block is any one of the following modes:

fixing the target transmission block to a first transmission block or a second transmission block;

selecting the target transmission block according to a signaling indication;

selecting a transmission block with a larger modulation encoding index as the target transmission block; and selecting a transmission block with a larger transmission block size and a larger ratio of the resources which are occupied by the transmission block as the target transmission block;

if two transmission blocks are configured and there is corresponding data information on only one transmission block, the target transmission block is a transmission block with no corresponding data information; and if one transmission block is configured, the target transmission block is the transmission block.

* * * * *